(12) United States Patent
Agarwal et al.

(10) Patent No.: US 10,686,983 B1
(45) Date of Patent: Jun. 16, 2020

(54) AUTOMATIC IMAGE CAPTURE MODE BASED ON CHANGES IN A TARGET REGION

(71) Applicant: MICROSOFT TECHNOLOGY LICENSING, LLC, Redmond, WA (US)

(72) Inventors: Abhishek Agarwal, Hyderabad (IN); Rahul Bhuptani, Hyderabad (IN); Mahesh Sridharan, Hyderabad (IN); Onkar Nath Tiwari, Hyderabad (IN); Sachin Talreja, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

(21) Appl. No.: 16/234,408

(22) Filed: Dec. 27, 2018

(51) Int. Cl.
*H04N 5/232* (2006.01)
*G06K 9/62* (2006.01)

(52) U.S. Cl.
CPC ....... *H04N 5/23222* (2013.01); *G06K 9/6212* (2013.01); *G06K 9/6215* (2013.01); *H04N 5/23218* (2018.08)

(58) Field of Classification Search
CPC ........... H04N 5/23222; H04N 5/23218; G06K 9/6212; G06K 9/6215
See application file for complete search history.

(56) References Cited

U.S. PATENT DOCUMENTS

| | | | |
|---|---|---|---|
| 2004/0175042 A1 | 9/2004 | Kroeker et al. | |
| 2010/0202026 A1* | 8/2010 | Chiu | H04N 1/107 358/488 |
| 2013/0155474 A1 | 6/2013 | Roach et al. | |
| 2014/0050367 A1* | 2/2014 | Chen | H04N 5/23212 382/112 |
| 2014/0268247 A1* | 9/2014 | Sakaida | H04N 1/387 358/406 |
| 2015/0054975 A1 | 2/2015 | Emmett et al. | |
| 2017/0083762 A1* | 3/2017 | Segalovitz | G06K 9/4628 |

FOREIGN PATENT DOCUMENTS

| | | |
|---|---|---|
| CN | 101634795 A | 1/2010 |
| JP | 2011502224 A | 1/2011 |

OTHER PUBLICATIONS

Dong, et al., "Automatic image capturing and processing for PetrolWatch", In Proceedings of the 17th IEEE International Conference on Networks, Dec. 14, 2011, pp. 236-240.
Tam, et al., "Quadrilateral Signboard Detection and Text Extraction", In Proceedings of the International Conference on Imaging Science, Systems and Technology, Jun. 23, 2003, 6 pages.

* cited by examiner

*Primary Examiner* — Shahbaz Nazrul
(74) *Attorney, Agent, or Firm* — NovoTechIP International PLLC

(57) ABSTRACT

A series of frames or live images received by a camera can be processed by an automatic image capture system to determine when an automatic image capture should take place. The system can detect when a scene change occurs by comparison of data for two or more frames, and for particular regions in those frames. If a scene change for the specified region is followed by a stabilization of the scene in that region, the system can trigger an auto-capture of at least the stabilized region of the scene, without the need for any user input.

20 Claims, 23 Drawing Sheets

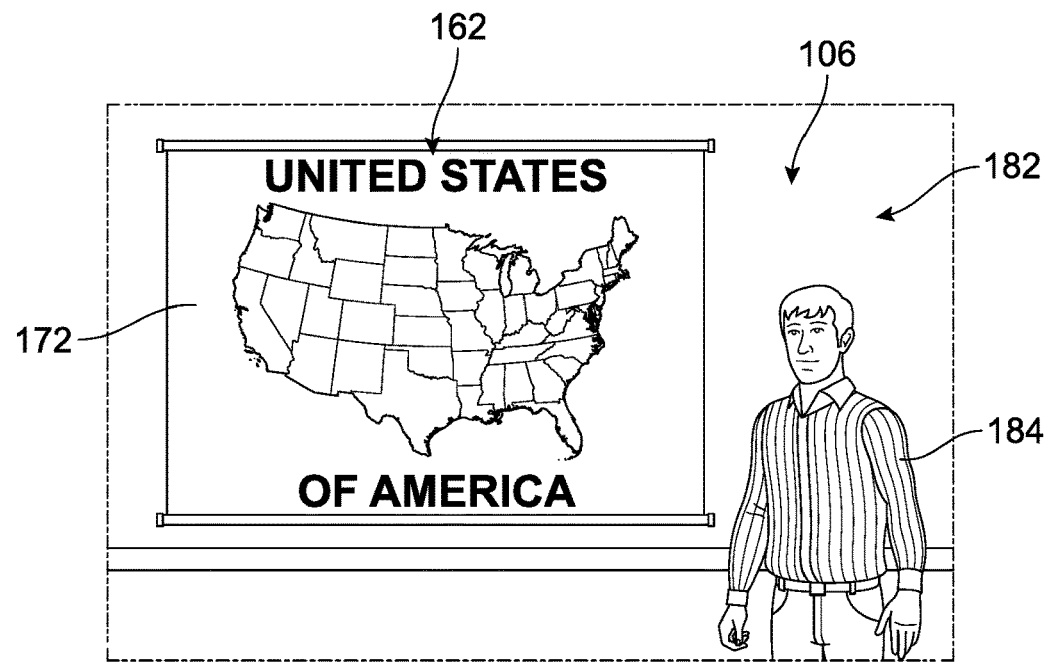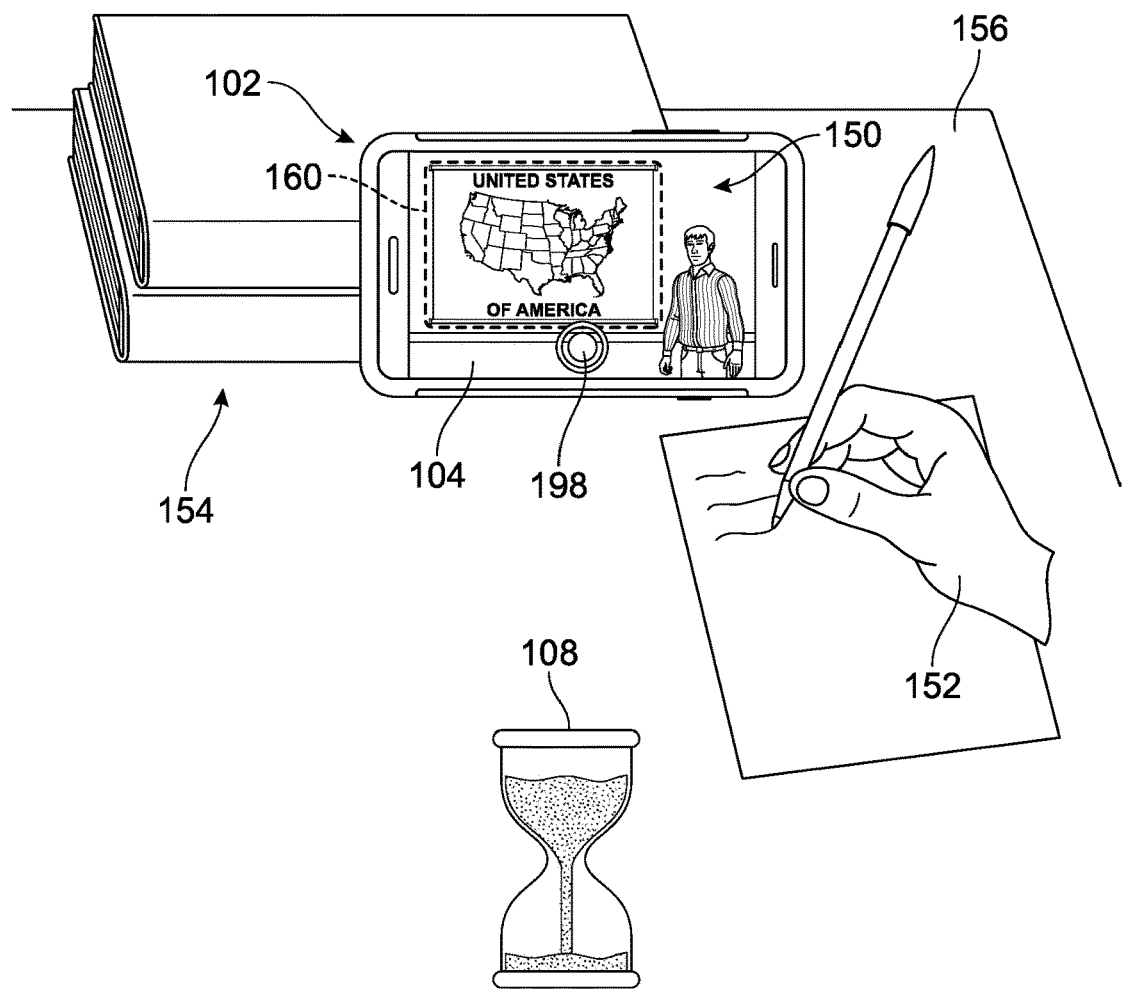
FIG. 1A

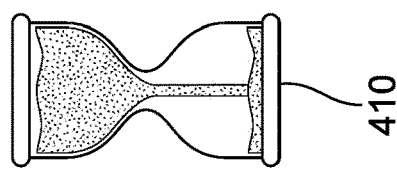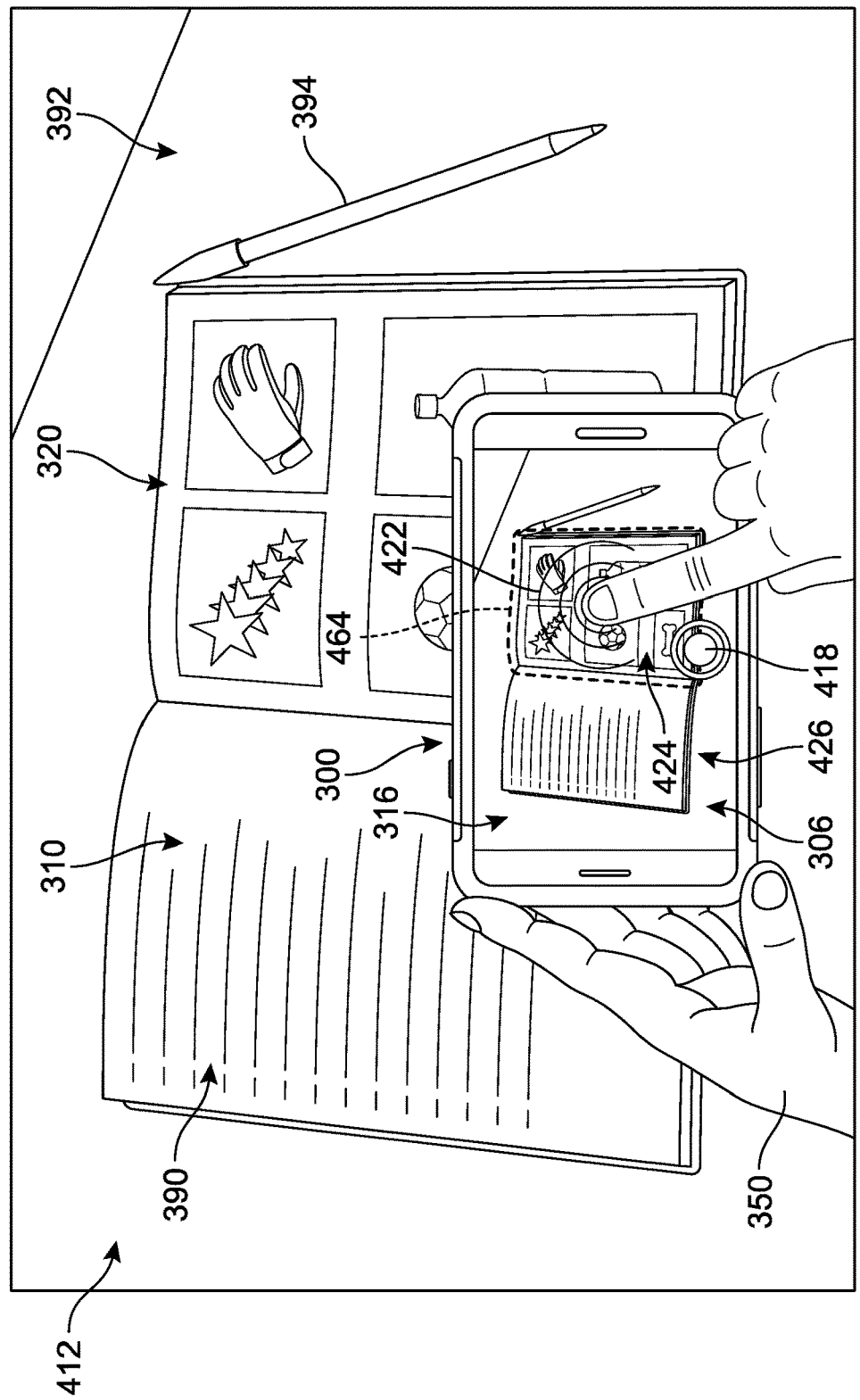
FIG. 4A

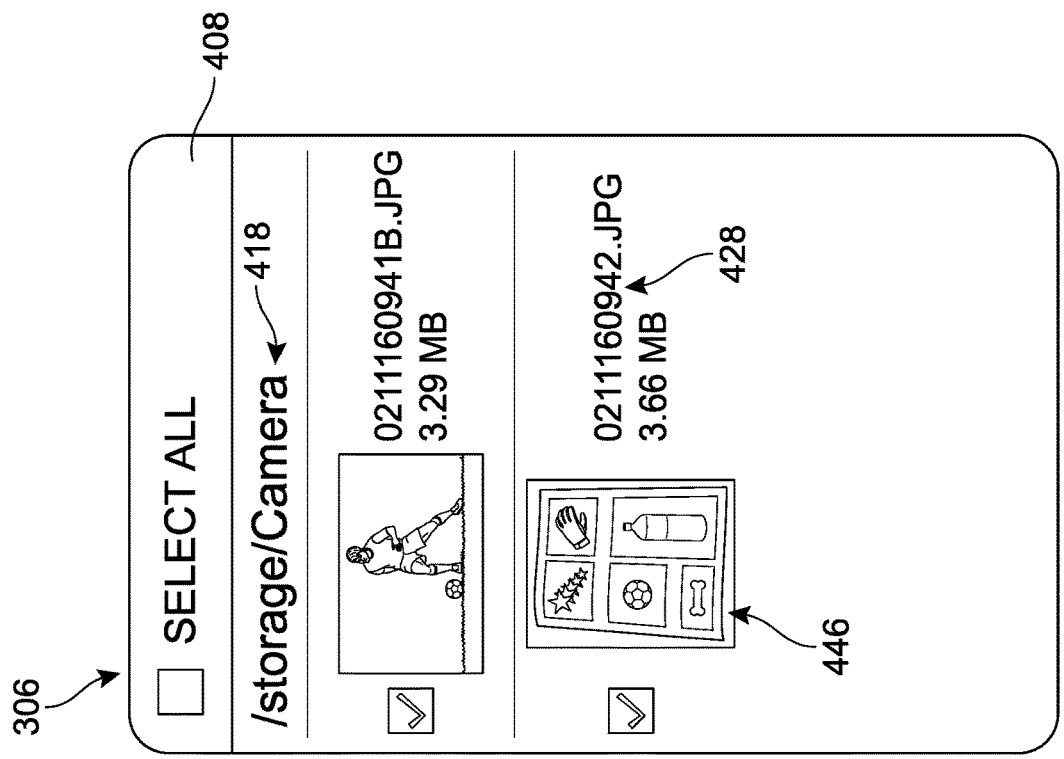
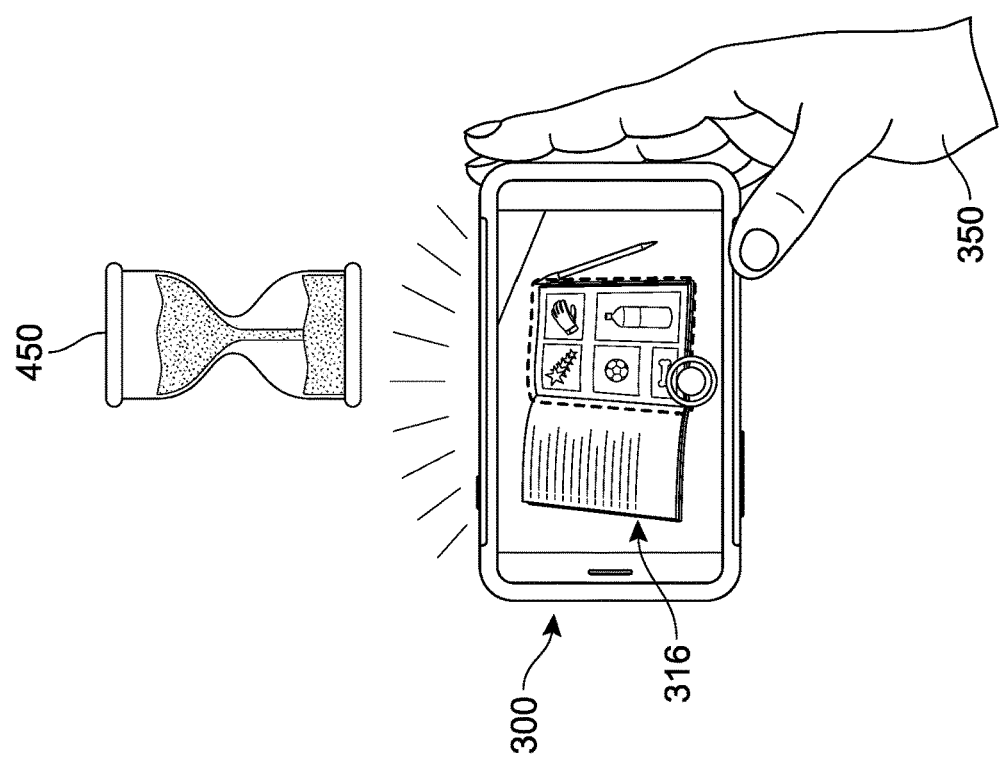
FIG. 4B

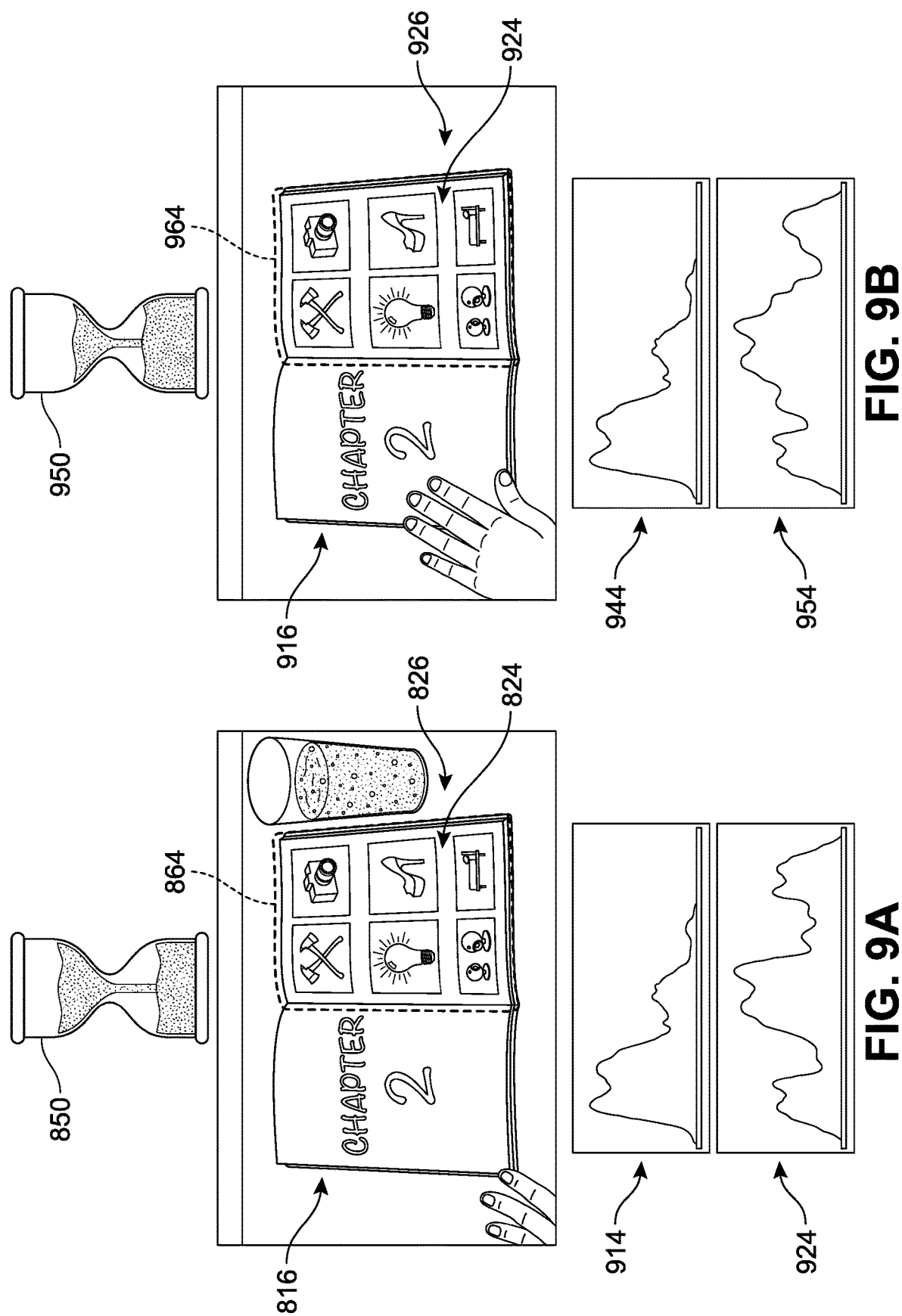

AUTOMATIC IMAGE CAPTURE MODE BASED ON CHANGES IN A TARGET REGION

BACKGROUND

Computing devices that include cameras have become increasingly common and mobile, and include devices such as laptop computers, tablet PCs, digital camera devices, mobile phones, ultra-mobile PCs, as well as other mobile data, messaging, and/or communication devices. Users may make use of cameras associated with computing devices to take various pictures of scenery as well as capture images of presentations, whiteboards, business cards, documents, sketches, paintings, and so forth. The users can then refer to the captured images to recall information contained therein such as diagrams, pictures, lists and other text, and so forth. In many cases, users intend to make use of information from captured images in their own documents, notes, and/or presentations.

A traditional technique utilized to capture images involves the use of photo applications that rely on user input to capture a scene. In other words, the user must launch the camera and/or application, point at the desired scene, and click to capture the image. Often the user may wish to capture images that change in a specific zone or region—for example, pages of books, slides, or other such objects. Unfortunately, operating the phone single handed and clicking the photo to achieve a stable, clean photo while maintaining focus on the desired object on the screen remains challenging. In addition, arranging for a repeated image capture of a particular object without requiring user input has been difficult to achieve. Thus, there remain significant areas for new and improved ideas for the efficient capture of digital content with minimal user effort.

SUMMARY

A system, in accord with a first aspect of this disclosure, includes at least one processor and one or more computer readable media. The computer readable media include instructions which, when executed by the at least one processor, cause the at least one processor to receive a first image corresponding to a first real-world scene that includes a first object, the first object including a first object interior, as well as automatically detect, within the first image, a first zone that corresponds to the first object interior. The instructions also cause the at least one processor to receive a first user input requesting an image capture of at least the first zone, capture, at a first time, at least the first zone of the first image in response to receiving the first user input, and receive, at a second time subsequent to the first time, a second image corresponding to a second real-world scene that includes the first object, the first object including a second object interior. Furthermore, the instructions cause the at least one processor to automatically detect, within the second image, a second zone that corresponds to the second object interior, determine that the first zone and the second zone differ by at least a first minimum amount based in part on a comparison between the first zone and the second zone, and automatically capture at least the second zone of the second image based in part on the determination that the first zone and the second zone differ.

A method, in accord with a second aspect of this disclosure, includes receiving a first image corresponding to a first real-world scene that includes a first object, the first object including a first object interior, and the automatically detecting, within the first image, a first zone that corresponds to the first object interior. In addition, the method includes receiving a first user input requesting an image capture of at least the first zone, and then capturing, at a first time, at least the first zone of the first image in response to receiving the first user input. The method also involves receiving, at a second time subsequent to the first time, a second image corresponding to a second real-world scene that includes the first object, the first object including a second object interior, and automatically detecting, within the second image, a second zone that corresponds to the second object interior. Furthermore, the method includes the steps of determining that the first zone and the second zone differ by at least a first minimum amount based in part on a comparison between the first zone and the second zone, and automatically capturing at least the second zone of the second image based in part on determining that the first zone and the second zone differ.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 1A and 1B each illustrate an implementation of an image capture application and environment;

FIG. 4A is an example of image capture of a first real-world scene;

FIG. 4B is an implementation of an automatic image capture and an implementation of a user interface for an application configured to manage image storage;

FIGS. 9A and 9B are examples of regional image stabilization with corresponding histograms;

DETAILED DESCRIPTION

Figure 1B:
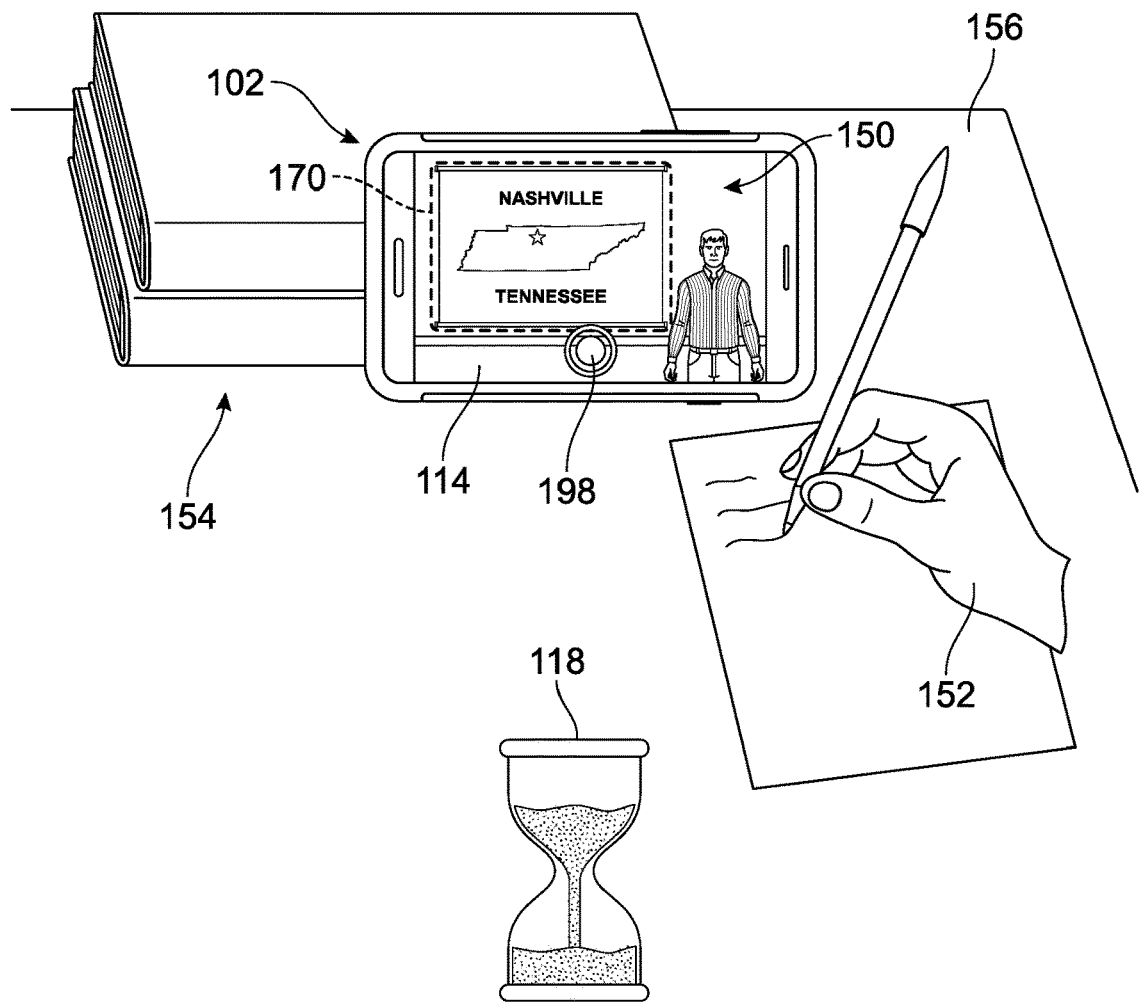

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following implementations introduce an image capture application toolbox for facilitating repetitive camera photography and scan operations. Automatic image capture processes are proposed that can be triggered by detection of scene changes within a particular region followed by scene stabilization of that region. In some implementations, the systems can be configured to receive a series of images or frames and compare a recently received image with a previously received image to determine whether a scene change has occurred. Traditionally, scanning image capture workflow has included a series of steps where a user can: (1) point a camera at a real-world scene; (2) steady and wait to focus the camera; (3) provide an input indicating the desired region; (4) provide another input that triggers the capture; (5) capture the photo; and (6) repeat these steps as needed to take multiple photographs. Thus, in order to ensure the desired scenes are captured, beyond pointing the camera to orient the lens toward the scene, a user must continue to provide a follow-up input that confirms that this is the scene that should be captured. In many cases, this follow-up input can lead to a destabilization of the camera, a change in the focus of the camera, blurriness in the image, or a delay that means the specific scenery is missed or no longer framed correctly. In addition, the need for user input means the user cannot turn away from the camera or become involved in any other activity in order to ensure the image is captured. Furthermore, in cases where there are multiple images to be captured of various scenes, the process can become repetitive, time-consuming, and tiresome to a user. The disclosed implementations offer an auto-capture mode where a user may point or otherwise orient a camera toward one or more real-world scenes and, without any further user input, automatically capture photos of said scenes. In some implementations, the process will be initiated when a determination is made that a region within the scene differs from a previously viewed or captured scene corresponding to the same region. Auto-capture can then be triggered if at least the target region is stable for some period of time. Such a system can offer users the ability to capture images of a particular object without requiring repetitive input. In addition, users can enjoy the ability to engage in other activities during the image capture process without loss of image quality or image capture reliability.

As introduced above, various applications can be used to receive, capture and/or present digital images or electronic content. As one example, the term "electronic content" or "image" includes any digital data that may be visually represented, including but not limited to an electronic document, a media stream, real-time video capture, real-time image display, a document, web pages, a hypertext document, any image, digital video or a video recording, animation, and other digital data. As an example, this electronic content may include images captured by photography applications, or other software configured to provide users with tools for use with digital images.

Furthermore, within some types of documents, the electronic content can be understood to include or be segmented into one or more units that will be referred to as image content regions ("content regions"), or more simply, regions. As one example, the term "region" describes portions of digital content that are identifiable and/or selectable as distinct or discrete segments of an image. As an example, one collection of electronic content (such as a digital photograph) can be characterized as or by a plurality of regions that may each include one or more image content portions ("content portions"). In different implementations, a first image content region may overlap with a portion of another, second image content region in the same image. Thus, a content region includes any part of an electronic content that may be defined or discernable by the system. For example, a content region may be automatically discerned from a characteristic of the content portion itself or relative to other content portions (e.g., a color, luminosity level, an edge detection, shape, symbol, pixel), or may be manually defined by a reviewer or end-user (e.g., selected set of pixels or object, quadrangular region), or any other selected portion of a digital image.

Furthermore, an end-user (or "user") as one example is one who captures, edits, views, manages, or deletes pieces of electronic content, including the creation, viewing, or updating of selected regions in the electronic content. An end-user includes a user of application programs, as well as the apparatus and systems described herein. Furthermore, for purpose of this description, the term "software application", "software", or "application" refers to a computer program that performs useful work, generally unrelated to the computer itself. Some non-limiting examples of software applications include photography software, image capture/editing applications, word processors, spreadsheets, slideshows, presentation design applications, accounting systems, and telecommunication programs, as well as gaming software, utility and productivity tools, mobile applications, presentation graphics, and other productivity software.

The software application that may incorporate the disclosed features can be installed on a client's device, or be associated with a third-party application, such as a web-browser application that is configured to communicate with the device. These devices can include, for example, desktop computers, mobile computers, mobile communications devices (such as mobile phones, smart phones, tablets, etc.), smart televisions, gaming devices, set-top boxes, and/or any other computing devices that include a camera and/or an image-display capability. Generally, such applications permit end-users to capture or scan documents, presentations, real-world objects, and other subjects using images received by a camera or images stored or accessed from memory. Furthermore, in some implementations, camera-based scanning applications can be configured to correct for the effects of perspective on rectangular or other polygonal objects such as books, pages of a book, paper, business cards, whiteboards, screens, and so forth.

During the scanning of images, end-users can be slowed or hindered in cases where there are multiple potential regions available for scanning. As one example, scan or scanning refers to the mechanism by which an application identifies, selects, isolates, or otherwise determines a boundary for a particular region in an image that may be of interest to a user. Thus, scanning may occur in real-time (e.g., while a camera is pointed at a scene or object(s)) and/or following the capture, generation, or storing of an image in memory, and may be understood to permit a high-resolution capture of a particular region within an image. In other words, scanning can in some implementations involve the capture of a smaller region within a larger, captured image.

In some of the following implementations users are provided with the ability to identify quads associated with a given locus. In some implementations, if multiple quads are available or detected in an image, a finger tap by a user in an area associated with the desired quad can be configured to help determine boundaries (i.e., a perimeter) of a potential quad or target region associated with the 'tapped' area. Such an application enables users to capture one or multiple regions of their choice. Thus, in different implementations, a user can aim a camera of a portable device towards a subject and initiate a capture or recording of an image of the subject using a button, voice command, touch, stylus, mouse, direction keys, and/or other suitable input devices. When the capture is initiated by the user, a capture operation can occur to capture an image of the subject. The image capture can initiate various processing of the captured image to detect a first scannable region and present the region to the user. A touch input or touch event on a touch-screen can indicate the user's area of interest, and detection of a different, second region will be attempted. The location of the touch input can be used to narrow the range of possible regions to only those that include the image content portion identified by the user.

For purposes of simplicity, the following implementations discuss the use of the system within the context of mobile computing devices, such as mobile phones and tablets. However, any electronic device with a camera may benefit from the use of these systems. These devices can provide users with several input mechanisms, including a home button, a power button, a mode button, and/or a camera shutter (image-capture) button, which may be installed as hardware, or available via a touchscreen display which can display a touchscreen camera shutter button. In some cases, a user may opt to use the touchscreen camera shutter button rather than a mechanical camera shutter button. The camera shutter button of a mobile device can in some cases be equipped with the ability to detect "half-press" and "full-press" as distinct, separate actions. For example, a half-press refers to the partial actuation of a button or other control, while a full-press refers to a further actuation of the button or control past a determined limit. In some examples, the device can include a dual-action camera shutter button that can detect a half-press (where input data is received with the mobile device that is associated with auto-focus functionality) and also detect a full-press (where input data is received that is associated with camera invocation and image capture). In addition, some devices may include one or both of a frontward-facing lens and a rearward-facing lens, as well as a microphone.

In cases where the input mechanism is provided via a touch screen display, additional options can also be used to control a subset of the image-capture functionality. In different implementations, such controls can include a still image capture mode button, a video capture mode button, an automatic image capture mode button, zoom-in and zoom-out controls, and an options or settings control. As will be described in further detail below, an automatic image capture mode button can be implemented as a toggle switch to enter and exit the auto-capture mode. In other words, once the auto-capture mode is on, pressing the mode button again would constitute an override of the auto-capture function. In one implementation, auto-capture mode can be deactivated through other mechanisms as well, such as activation of the camera shutter button. Some implementations of the automatic image capture system can be used in either still image capture mode or video capture mode It may be appreciated that the use of an electronic shutter is one aspect in which a digital electronic camera in a mobile device typically differs from a conventional, stand-alone, digital camera. Electronic shutters tend to have a long "shutter-lag time" between when the user activates image capture and when the image is actually captured. Like a slow shutter speed, a long lag time can cause reduced image quality due to blur from vibration of the camera during image capture. Another difference between a digital electronic camera in a mobile device and stand-alone digital cameras is that the lens aperture is typically smaller in a camera used with a mobile device. As a result, less light enters the lens, necessitating the use of a slower shutter speed to compensate for the small aperture size.

In the case of conventional, SLR (single lens reflex) or point-and-shoot digital cameras, a tripod can be used in low light conditions to stabilize the camera body and prevent vibrations from degrading the sharpness of the image. However, use of a tripod requires preparation, which is inconvenient, and therefore tripods are generally not a feasible solution for camera-phone photography. Consequently, camera-phones are typically not equipped with a tripod screw, or other mounting hardware, thus precluding attachment of a tripod or other stabilizing structure to overcome image quality disadvantages inherent in the construction of cameras that are integrated with mobile devices. However, these types of drawbacks can be readily mitigated by the use of an auto-capture system, as will be described herein.

The following implementations are configured to provide users with the ability to capture images via an image capture application without manual direction or input. Such an application enables users to capture one or multiple images using the device of their choice without the delay or motion associated with manual user inputs. In different implementations, a user may wish to capture a series of images over a period of time when a portion of the scene that is being viewed changes. Using this system, a user can aim a camera of a portable device towards a scene that includes a particular target region and initiate an ongoing automatic capture or recording process of the region, whether portions of the image that are external to the selected region (i.e., background) remain static or change. Alternatively, a user may select a previously captured (stored) set of image files or a video file and initiate an auto-capture of one or more specific target regions contained in these files.

In order to better introduce the systems and methods to the reader, FIGS. 1A and 1B present an example of a representative image capture environment for implementing an automatic image capture system (the system is illustrated schematically in greater detail in FIG. 2). In different implementations, the environment can include one or more computing device end-users, or simply "users" who can capture, view, edit, and/or modify the image (for example a first user, a second user, a third user, etc.). One or more users can interact with or manipulate the image presented via a user device. As users view an electronic content such as an image on a display, various regions of the image may be detected or the image may be otherwise identified for potential capture. In many cases, users are presented with a "live preview" of the real-world landscape as it is being viewed through the camera, though in other cases this preview can occur when a user opens or accesses a previously created image file or media.

In different implementations, the image capture application can incorporate the functionality of a computing device to implement camera-based capture techniques that are described herein. The interfaces are typically presented in conjunction with a "viewfinder" that can present current images received by the camera optical lens and/or switch to present a captured image (i.e., from memory) when a picture has been taken or is being accessed from storage. In addition, in some implementations, a user may be able to modify and/or select portions of a captured image through interaction with the viewfinder portion of the display.

In FIG. 1A, a first computing device ("first device") 102 is shown in the process of receiving a first image preview 104 from a first real-world scene ("first scene") 106 at a first time 108. In addition, FIG. 1B shows the first device 102 in the process of receiving a second image preview 114 from a second real-world scene ("second scene") 116 at a second time 118. Each preview is shown via a device touch-screen display 150 that also functions as a user interface.

In this example, first image preview 104 and second image preview 114 are digital images that each include one or more image sectors. An image sector may be understood to refer to a potential or possible scannable region comprising a number of pixels. One sector is represented here by a small rectangular shape (quadrangle or "quad"). However, in other implementations, the sector may be defined by other regular shapes, such as triangles, circles, pentagons, or other different geometric or irregular shapes. For purposes of simplicity, the sector or quad in this case corresponds to a distinct item in the real-world. In FIG. 1A, a first sector 160 corresponds to a projector screen 162 in the first scene 106, and in FIG. 1B, a second sector 170 corresponds to the same projector screen 162 as shown in the second scene 116. The first sector 160 and the second sector 170 can each be associated with a perimeter (e.g., outer boundary, contour, or shape) that are similar. This similarity can in some implementations be detected by the system, as will be discussed further below. While only one target sector is depicted for purposes of simplicity, an image can include any number of sectors.

In this illustration, each of the first scene 106 and the second scene 116 can be understood to depict a portion of a classroom or meeting room. The first scene 106 and the second scene 116 include the projector screen 162, a wall 182, and a presenter 184. Thus, the first scene 106 and the second scene 116 are substantially similar in that they include the same 'main' objects. In some but not all implementations, the display 150 can be configured to receive data from the camera that is associated with the first device 102 to present a live preview of the items or objects in the camera's field of view through an image capture or image scanning application. In one implementation, as noted above, the application can offer a graphical user interface, in conjunction with the image preview, referred to herein as an image content viewing interface ("interface") 198. In some implementations, the interface 198 can be presented 'full-screen' on the display 150 or on only a portion of the display 150. In addition, in some implementations, the interface 198 may be substantially transparent or translucent, such that user interactions with the screen or image are received as inputs by the application while the image itself remains mostly visible without superimposition of additional interface graphics that would otherwise obstruct view of the image. However, in other implementations, the image capture application can present a variety of graphical elements in association with, overlaid on, or adjacent to the image, such as a menu, settings, or other options.

Generally, the term "interface" should be understood to refer to a mechanism for communicating content through a client application to an application user. For example, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, such as a finger tap, keyboard command, voice command, or mouse-click, which can trigger a change in the display or functioning of the application or device.

In some other implementations, the interface associated with the image capture application can be configured to display or present various indicators to guide a user to any scannable regions detected in the image. For example, the user interface may be configured to display or present a menu, symbols, or other actuatable options that can permit a user to easily navigate through any detected scannable regions and/or simply alert a user that multiple or alternative scannable regions ("candidate regions") are available in the same image. In some implementations, the detected regions can be highlighted or presented in order of a statistical probability that the targeted region is the scannable region that is desired by the user. However, in other implementations, the application may only detect a first region and search and/or detect alternative (second) regions if, for example, the user subsequently provides some sort of input that corresponds to a request for detection of other region(s).

In FIG. 1A, the first scene 106 shows a first slide 172 being presented on the projector screen 162, and in FIG. 1B, the second scene 116 shows a second slide 174 being presented on the projector screen 162. In this example, the first slide 172 and the second slide 174 differ from one another. As noted earlier, the systems proposed herein can include provisions for detecting changes in a particular region of a scene and triggering an automatic capture of the 'updated' or changed scene. Thus, in some implementations, as a user 152 (represented by a hand) orients or positions the camera lens of the first device 102 in a direction that is generally towards or facing the projector screen 162, the system can receive and then capture an image of at least the region that was identified earlier by a user as being of interest (in the example of FIG. 1A, the first slide 172). As the presenter 184 continues his discussion, he might advance through his slide deck to another slide. In FIG. 1B the second sector 170 of the second image preview 114 has changed relative to had been shown in the first sector 160 of the first image preview 104. This change can be detected by the system. It can be appreciated that this detection can occur whether the environment outside of the target region (i.e., the rest of the meeting room shown in the image) remains static or also changes. Similarly, auto-capture need not be triggered when there are changes in the outside environment but no changes in the target region.

In order to emphasize the utility of some of the proposed systems, an additional feature may be noted with reference to FIGS. 1A and 1B. As the system performs the actions described above, the device 150 itself remains apart from the user 152. In this specific example, the device 150 has been propped on a table 156, and leans against books 154 in a position that allows for the continuous view of the presenter 184 and the projector screen 162. As the slides change, the user 152 remains hands-free, secure in the knowledge that the camera is continuing to auto-capture each new slide as changes in the selected image sector or target region are detected. As will be discussed below, once the auto-capture mode has been enabled and the user has specified the particular region(s) of interest, no further user input is needed to ensure the capture of each updated target region scene. This process can be repeated indefinitely, to allow for automatic capture of multiple images as the selected region changes.

Figure 2A:
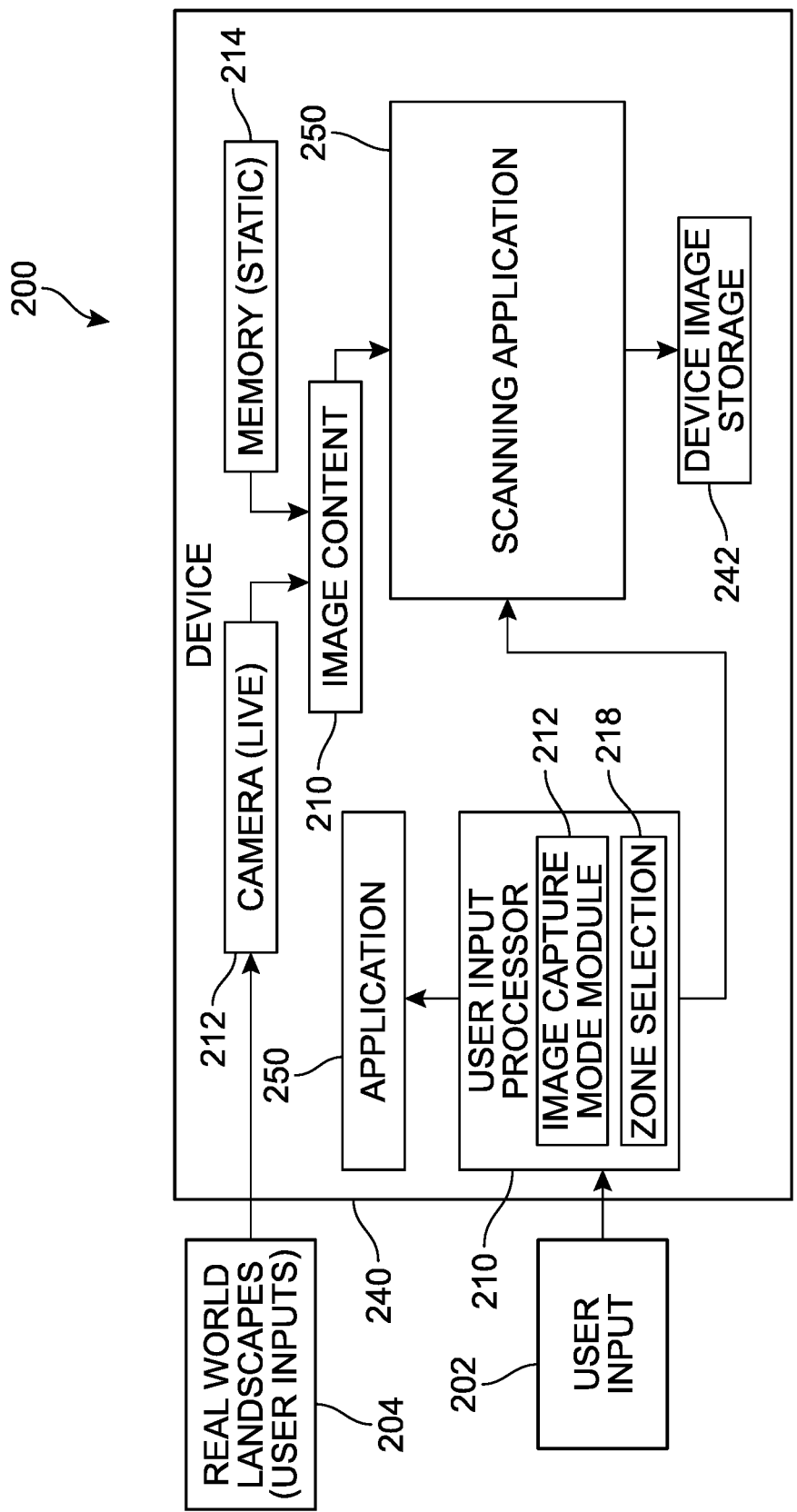
FIGS. 2A and 2B are a conceptual diagram illustrating one implementation of a distributed computing environment for managing the capture of images.
Figure 2B:
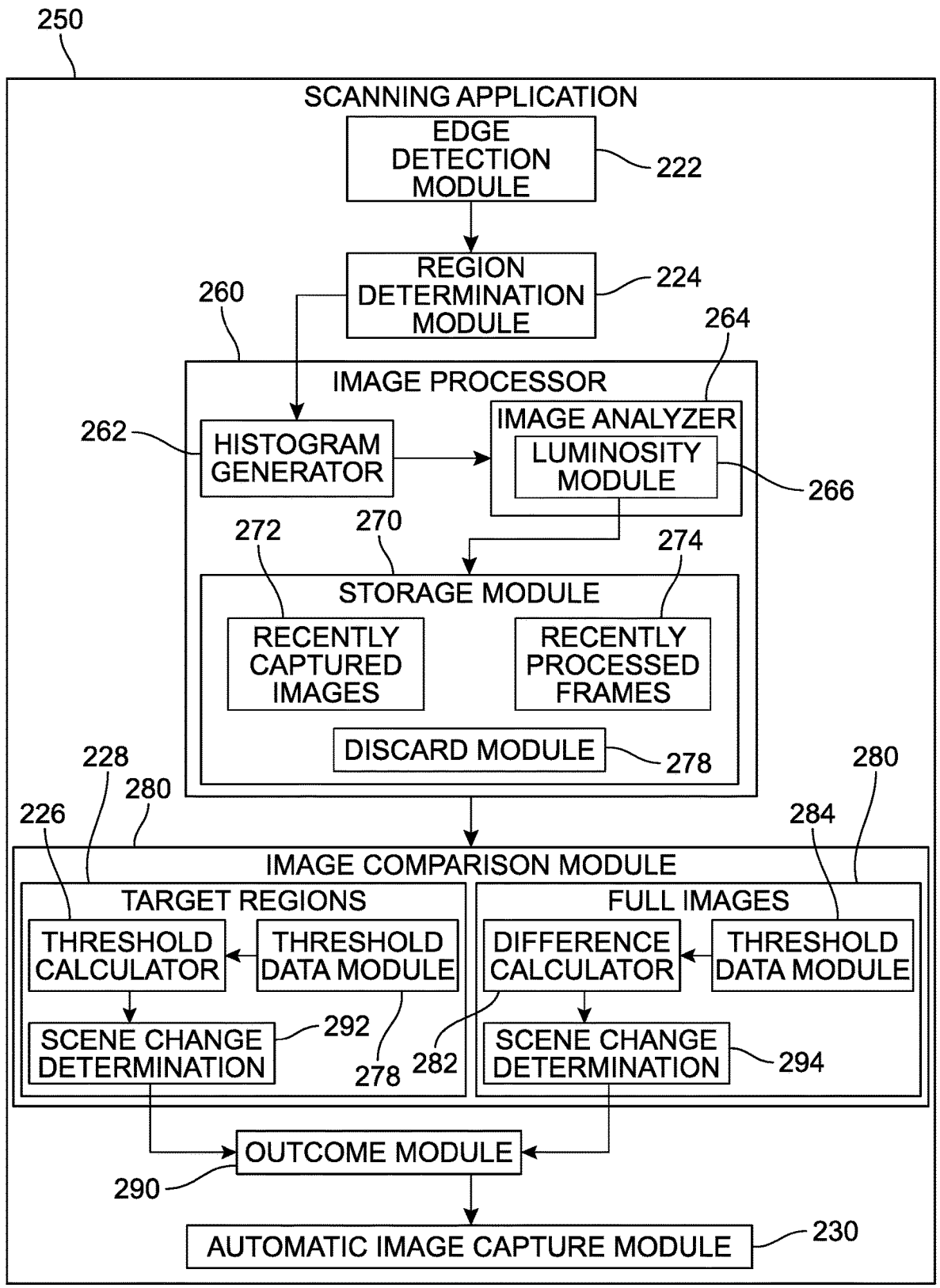

Referring now to FIGS. 2A and 2B, an example of a representative architecture of an automated image capture system ("system") 200 is depicted. In different implementations, the system 200 can be configured to present user interfaces for display of electronic content and indications of regional scene changes and stabilization. The system 200 can be further configured to continually update the repository of image data being analyzed as determinations of scene status and conditions are made. It is to be understood that the system 200 presented here is merely an example implementation, only some aspects are presented for purposes of clarity, and that a wide variety of other implementations are possible.

In FIGS. 2A and 2B, the system 200 includes a device 240. The device 240 can include any type of device capable of presenting image and/or image-related content, such as cameras, mobile phones, tablets, laptops, desktops, gaming devices, projectors, and other such devices, as discussed above. The device 240 can include a wide variety of hardware and software components. While an image capture or scanning application 250 is illustrated as being locally installed on the device 240 in this example, in other implementations, some or all aspects or features of the scanning application 250 may be accessed from another device or accessed from cloud storage computing services.

The scanning application 250 is configured to receive image content 210 via one or more components of the device 240 and/or via external sources. The image content 210 may have been previously captured or 'static'—accessed from a memory 214 (local, external, or cloud-based memory)—or can be 'live' and currently being viewed or captured in real-time via a camera 212 receiving external, real-world data (e.g., scenes) 204. The image content 210 can be received by the scanning application 250 and conveyed to an edge detection module 222 to evaluate whether the image is associated with any quadrangular regions, which can be correlated to (e.g., determined to be the same as) a previously selected target region via a region determination module 224.

The image content 210, along with any region-related information found in the image, can be submitted to an image processor 260, which is configured to process the data of image content 210. In some implementations, the image processor 260 is also configured to incorporate any region-related information generated by the region determination module 224. In different implementations, as will be described in greater detail below, the image processor 260 can receive the image content 210 and generate one or more histograms via a histogram generator module 262. In one example, the histogram can comprise or refer to any type of statistical method that is applied to the image content and can provide a numerical and/or graphical representation of the tonal distribution in a digital image. A histogram in this case can be configured to plot the number of pixels for each tonal value. An image analyzer 264 can then review the entire tonal distribution of an image, and determine the pixel intensity values for each pixel in the image. Thus, the histogram generator 262 can produce not just image-based histograms, but any type of data that can indicate the number of pixels in an image at each different intensity value found in that image. Because the exact output from the operation will depend on the implementation selected, the histogram may include a data file representing the histogram statistics and/or an actual graphical representation that may also be accessible to a user.

In some implementations, the image content can be processed in different color encoding systems that encode a color image or video taking human perception into account. In some cases, RGB color representation may be used. However, the use of YUV color encoding may be preferred as it is associated with a reduced bandwidth for chrominance components, thereby typically enabling transmission errors or compression artifacts to be more efficiently masked by the human perception than using a "direct" RGB-representation. Thus, in one implementation, the system can include a YUV processing component that can convert the image (e.g., an RGB image) into an image comprising luminance (Y) and chrominance (U and V) components (where the UV color space encodes a color image using a bandwidth allocation scheme that takes into account the frequency dependence of human color perception).

Some or all of the histogram data for each image content and/or target region can be received by the image analyzer 264, which can further process the statistical data and isolate or otherwise identify key values for the image. In one implementation, a luminosity module 266 can scan or review the data to determine the proportions of pixels in the image content or image region that are linked to specific luminosity values. This data can be submitted to a pixel intensity data storage module 270, which can hold in memory the histogram and/or luminosity data for recently processed (e.g., live preview) frames 274, as well as the data for captured images 272. These data will be transmitted to and evaluated by an image comparison module 280. In some implementations, the data that is no longer relevant to the comparison process, and/or has been in storage for greater than a pre-established period of time, can be discarded via a determination made by a discard module 278.

In some implementations, the image comparison module 280 can be configured to compute correlation coefficients between two or more image content items, and/or between two or more corresponding image regions. For example, a full image comparator 296 can receive the data from image processor 260 and the computed correlation coefficients for two images can be compared with the values provided by decision thresholds stored in a first threshold data module 284. These thresholds can be established by the system, and/or can be customized by the user via a settings option. In different implementations, the system can be configured to detect changes in scene by comparison of a sequence of two or more images. The system, via a first difference calculator 282, can determine whether two images are similar (i.e., that the scene is stable or has not changed enough to warrant a decision that a scene change has occurred) or different (i.e., to the extent that a scene change may be considered to have occurred) with reference to these thresholds and store, convey, and/or post-process the results in a scene change determination module 294.

Similarly, a target regions image comparator 228 can receive the data from image processor 260 and the computed correlation coefficients for two corresponding image regions can be compared with the values provided by decision thresholds stored in a second threshold data module 226. These thresholds can be established by the system, and/or can be customized by the user via a settings option. In different implementations, the system can be configured to detect changes in scene by comparison of a sequence of two or more corresponding images' target regions. The system, via a second difference calculator 278, can determine whether target regions in two images are similar (i.e., that the target region is stable or has not changed enough to warrant a decision that a target region's scene has changed) or different (i.e., to the extent that a target region's scene change may be considered to have occurred) with reference to these thresholds and store, convey, and/or post-process the results in a scene change determination module 294.

In some implementations, histogram "similarity" can be measured by computing the correlations between the histograms of the successive image frames. The transitions between scenes may be determined by comparing histogram correlations with empirically determined decision thresholds for three color spaces (e.g., YUV). For any two successive frames, if all three correlation coefficients are higher than the decision thresholds, a scene change may be identified. Otherwise, the two successive frames are assigned a "same scene" or "stable scene" classification. In another implementation, the decision may be based on only one or two of the three color spaces. In other words, the histogram data size may be reduced or minimized by isolation and use of Y color space values. In such cases, the use of device resources, including storage and processing, can be reduced, while providing substantially similar results to the cases where the determination is based on data from multiple color channels. Because the image comparison module 280 can evaluate the similarities of color and intensity histograms (e.g., histograms of YUV channels) of successive frames in the inputted image content based on only one color channel, the process as a whole becomes less onerous in its implementations and requirements. In some implementations, the difference calculators can compare histogram correlations with empirically determined decision thresholds for only one color space (e.g., Y). For any two successive frames, if the correlation coefficient is lower than the decision threshold, a scene change may be identified. Otherwise, the two successive frames are assigned a "same scene" or "stable scene" classification.

It should be understood that in different implementations, the system described may make reference to various parameters and criteria in addition to or in place of the histogram data described above. For example, the system may be configured to make use of one or more criteria in order to determine when an image is to be automatically captured and stored while the mobile device is operating in the auto-capture mode. These criteria can include one or more of an auto-focus value, a white balance value, an exposure value, a device stability value, a sharpness value, a gain value, a de-noising value, a contrast value, a flash value, or other such image quality and processing parameters. The auto-capture mode settings can be accessed as part of the general settings for the mobile device, displayed when the auto-mode is first activated, or displayed after a screen appears when the auto-mode is activated asking the user whether the settings are to be changed. A user may be provided with options to set threshold values for the various criteria and parameters to suit their preferences. Thus, in some implementations, when these threshold values are met for a current image sensed by the image sensor, the image can be captured and stored without further input from the user.

In some implementations, image statistics (such as but not limited to histogram data) are substantially continuously generated for each new image frame received by the image sensor, and the camera settings may also be continuously adjusted. In one implementation, these image data are not yet considered "captured" because they are not being finalized or subject to certain post-demosaicing processes that can be computationally intensive and need not be performed unless the image is intended to be converted into a final image ("captured") and stored. In some implementations, while YUV processing (or just Y processing) can occur, and only if the image is to be captured does any further post-processing steps occur.

The results of one or both of the scene change determination modules (292, 294) can be shared with an outcome module 290 in some implementations. An automatic image capture module 230 can communicate with the outcome module 290 and trigger the auto-capture functionality based on the determination. Images automatically captured can be stored in device image storage 242. In addition, the automatic image capture module 230 can convey instructions to the scanning application 250 that will be used in the next cycle of auto-capture.

It can be observed that the device 240 may also be configured to receive user input 202 via a user input processor 270. The user input 202 can vary widely based on the type of input means used. In FIG. 2, the user input 202 can be understood to be associated or correspond with some aspect of the scanning application 250 that is being viewed or accessed by the user. In one implementation, the user input processor 270 can receive instructions that toggle the automatic capture mode on or off via an image capture mode module 272. In addition, as will be discussed below, the user input 202 can indicate the particular target region(s) desired by the user for auto-capture.

Figure 3A:
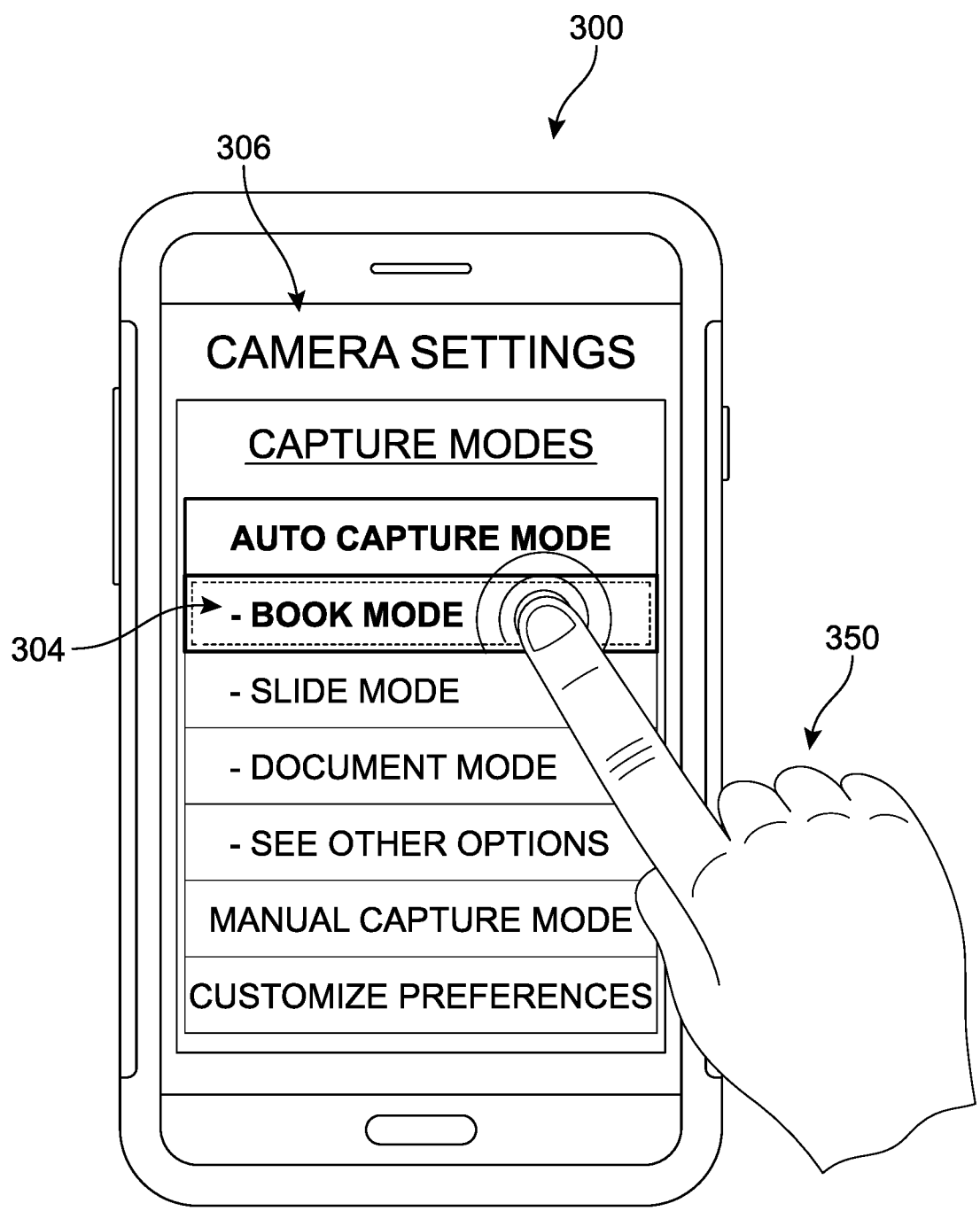
FIG. 3A is an example of a user interface for configuring image capture settings.

For purposes of clarity, a sequence providing a more detailed example of an automated image capture process will now be presented with reference to FIGS. 3A-10. Referring first to FIG. 3A, a user 350 is shown holding a second computing device ("second device") 300. A display 306 of second device 300 can presents an implementation of an image-capture graphical user interface (GUI) for an image capture application ("application") 304. In different implementations, the application 304 can be configured to display the GUI and various user interface elements, features, and controls to facilitate capturing images via a camera (not illustrated), scanning, and/or processing of images, in some cases in conjunction with a live preview of a scene or presentation of stored images.

In different implementations, the system can include provisions for receiving user inputs and selections in order to establish appropriate settings for the camera and system during particular applications. As shown in FIG. 3A, for purposes of example, the user 350 is depicted accessing a Camera Settings menu 312 via which several options are offered, including several capture modes. The user navigates through sub-options under an Auto-Capture Mode heading, and selects an option labeled "Book Mode". It can be understood that each sub-option can be configured to activate or apply a system configuration that can detect scene changes and stabilizations as well as identify key regions of interest in a manner that corresponds to the selected setting. These modes can be offered to the user upon start-up of the camera operation, be set as a default mode, and/or changed via a remote device linked to the camera settings. While only three sub-options are presented here, a wide range of other modes are possible, including modes custom-designed by a user.

In different implementations, a user can initiate a scan by viewing or capturing a real-world scene (e.g., taking a picture or photograph), by capturing or viewing an image that can include virtually-generated objects (e.g., screenshots or snipping tool), or by loading any previously captured or saved images or media files for viewing via or in conjunction with the scanning application. Often, the scenes can include one or more four-sided objects, such as a document, paper, business card, book, poster, photo, whiteboard, checks, artwork, boxes, stickers, and other such objects. It may be appreciated that the systems described herein would be readily implemented for detection of substantially rectangular objects in an image.

In some implementations, the application 304 can be configured to detect and/or identify four-sided objects within an image that may qualify as potential regions for scanning. These may also be referred to as quadrangular regions. Quadrangles within an image can be identified using a variety of feature extraction techniques suitable to find arbitrary shapes within images and other documents. For example, the system can employ one or more edge detection models to evaluate the output image content from the image segmentation processor. The edge detector includes or otherwise makes use of an edge detector model or algorithm operable to detect edges based upon visual differences, such as sharp changes in brightness. When edges have been identified, the edges may be joined into connected lines to form quadrangles. For instance, vertices (corners) can be identified through the edge detection and then the vertices can be connected to form quadrangles. This can involve, for example, correcting for imperfections in the detected edges and derivation of lines corresponding to the edges. Accordingly, a set of potential quadrangles can be derived using the detected edges and lines, where the lines are detected from similarly-oriented edges along a particular direction and are then combined to form the quadrangles. Thus, in some implementations, the application can be configured to detect portions of the viewed image that substantially correspond to four-sided shapes or objects.

In some implementations, the application 304 includes or otherwise makes use of an edge detector operable to detect edges based upon visual differences, such as sharp changes in brightness. When edges have been identified, the edges may be joined into connected lines to form a perimeter that has a quadrangular shape. For example, vertices (corners) can be identified through an edge detection mechanism, and these vertices can be connected or mapped to form quadrangles. As a result, a set of potential quadrangular regions can be derived based on the detected edges and lines, where the lines are detected from similarly-oriented edges along a particular direction and are then combined to form the quadrangles.

Figure 3B:
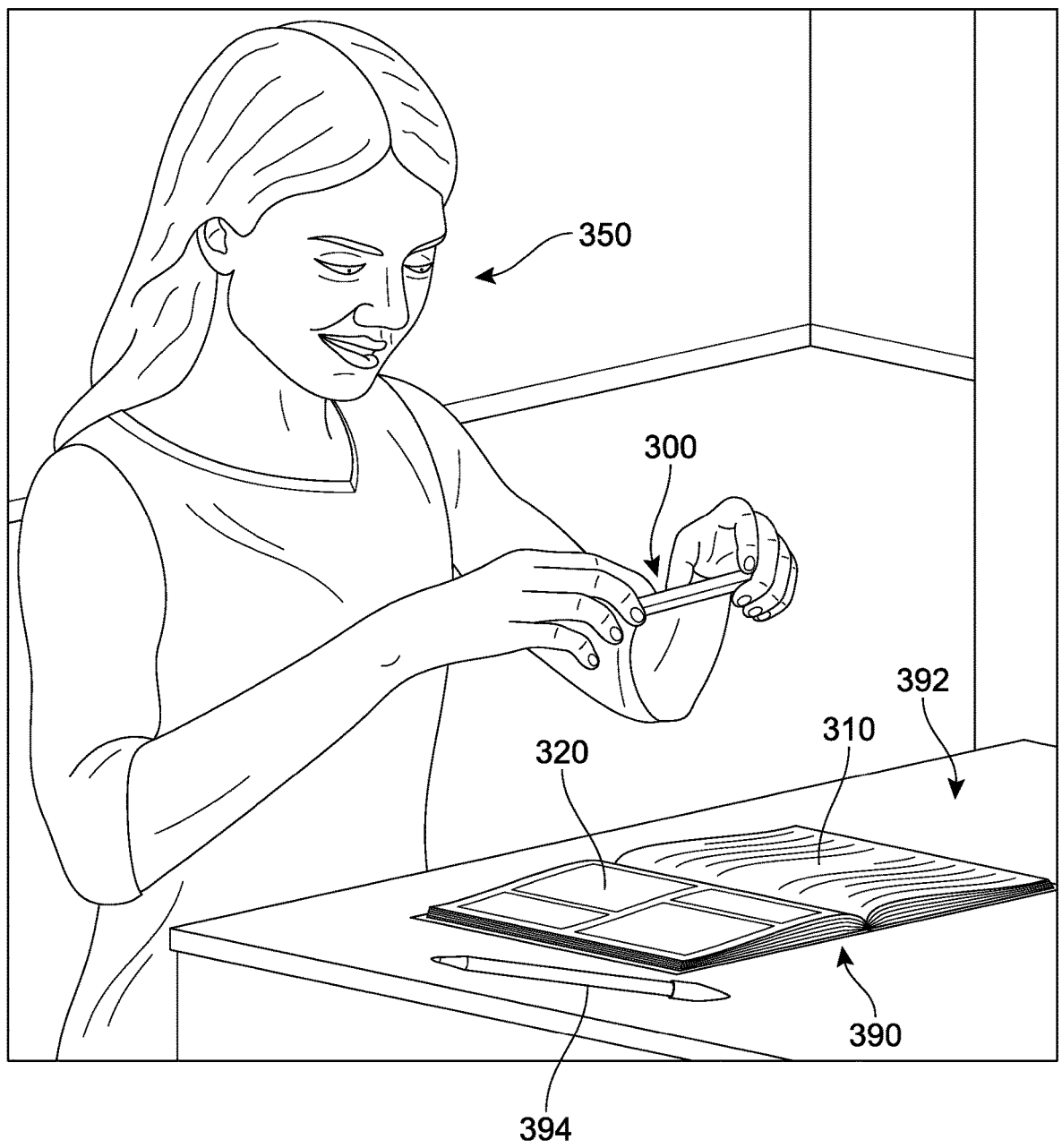
FIG. 3B is an example of a user preparing to initiate an image capture of a real-world scene.

In addition, as noted earlier, in some implementations, systems associated with the application 304 can be configured to detect when scene changes and scene stabilizations occur with respect to a designated quadrangular region. In FIG. 3B, the user 350, having selected the mode that was best suited to their task in FIG. 3A, is shown positioning the second device 300 such that the camera optical lens is directed toward a book 390 lying on the surface of a table 392, adjacent to a pencil 394. The opened book 390 has two pages (a first left-hand page 310 and a first right-hand page 320) that are visible to the user 350.

In FIG. 4A, the second device 300 is presenting a real-time live preview of a first real-world scene ("first scene") 412 via a camera connected to or integrated in the second device 300 (in this case, a mobile phone). The user 350 (represented by hands) is holding the second device 300 such that the camera is framing the first scene 412 and producing a first image frame ("first image") 316 on a display 306 at a first time 410. In this example, the first image 316 shows the two pages of the book 390 (specifically of first left-hand page 310 and first right-hand page 320), the pencil 394, and the table 392.

As noted earlier, in different implementations, the system can include provisions for identifying specific portions of an image that are to be captured. For example, a finger tap by a user in an area associated with the desired object can be configured to help determine boundaries (i.e., a perimeter) of a potential sector associated with the 'tapped' region. Thus, a touch (or other type of) input or touch event on a touch-screen can indicate the user's area of interest. In some implementations, the boundary associated with a selected region is highlighted or otherwise differentiated to inform a user of the region that has been detected, identified, and/or is currently selected (see below). As an example, in FIG. 4A, the user 350 has touched a portion ("first zone") 422 of the first image 316, thereby providing an input to interface 410. The selected first zone 422 corresponds to a sub-scene of the larger first image 316.

In some implementations, such an input is received by the application as representing an indication of the user's desired target region. In response, the system can detect whether there are any other possible scannable regions associated with the area of the image that has been selected. In this case, the application detects a first target region ("first region") 424 that includes the first zone 422. It can be observed that the interior of the first region 424 includes the content (e.g., information) of the first right-hand page 320 in this example. For purposes of reference, the remainder of the first image 316 (following removal of the first region 424) will be identified as a first contextual region 426.

Once a desired region for scanning has been identified, in different implementations, the scanning operation of the application can be activated. The display 306 in FIG. 4A further includes an indicator 464 that is associated with or surrounds a first perimeter of the first region 424. The indicator 464 can indicate to a user that a candidate region has been detected, and/or identify the region's boundaries. Such indicators may appear in the user interface to help distinguish or highlight quadrangles that are detected and/or have been selected within a captured image. The indicator can vary in different implementations, and can include various effects, such as blinking, changes in luminosity, superimposition of graphical elements along portions of the detected region, flashing, animated lines, color changes, flags, graphical elements such as points or circles at each vertex and dashed or solid lines appearing along edges, or other such visual indicators. For example, in FIG. 4A the indicator 464 is shown as a thick boundary line and/or an increased brightness that substantially surrounds the first region 424.

It may be appreciated that in many cases, a first detected region that is identified by the application as a potential scanning candidate may not correspond to the region that was specifically desired for scanning by the user, or that this first detected region may be only one region of many that a user intended to scan. In different implementations, a user can provide an input signal that can be used by the application to refine or improve the region detection process. This signal can vary, but can include a user input that designates another (second, third, etc.) different portion or zone of the display that is located within the boundaries of the region desired by the user for scanning. In one implementation, upon receiving a user input indicating one or more particular sets of pixel coordinates, the application can be configured to detect only those region(s) in the image that contain or include the one or more designated coordinates.

Thus, in other implementations, two or more regions may be selected simultaneously for scanning. This can greatly decrease the time needed to collect desired content from an image. Rather than requiring a user to re-take a photo, crop the photo, zoom-in, focus, adjust lighting conditions, increase contrast, or manipulate other image parameters in attempts to 'coax' the application to detect the desired region, the user is able to simply touch (or otherwise interact with) any portion of the image that is included in the desired region and the application automatically detects the correct region.

It should be understood that alongside the tools described herein, other scanning features can remain available to users while using the application. For example, in some implementations, the various indicators may be selectable by the user to permit adjustments to a selected quadrangle, such as by dragging of a corner to reposition the corner. As another example, a user may define a custom quadrangle by selecting one corner through interaction with the user interface and the application can in some cases automatically derive a corresponding quadrangle based upon the user selection of the specified corner. The user may also be able to apply a select and drag tool with the user interface to more directly identify an area for selection (e.g., custom quadrangles).

In different implementations, the system can include provisions for storing the images captured by the camera. In FIG. 4B, the scan operation initiated in FIG. 4A is shown being completed at a second time 450 subsequent to the first time 410 of FIG. 4A. In some implementations, the first image 316 can be automatically stored in a designated folder associated with the application 304. In this example, the first image 316 has been saved in a '/storage/Camera' folder 418 as a first auto-captured image 428, accessed via a captured images viewing interface 408 on display 306.

Figure 5C:
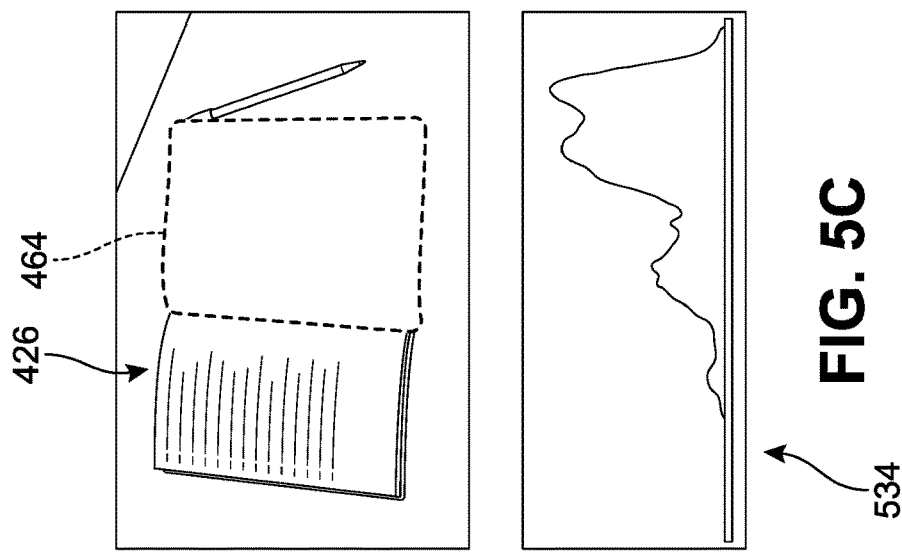
FIGS. 5A-5C are examples of histograms for the image captured in FIG. 4B and two regions in the image.
Figure 5B:
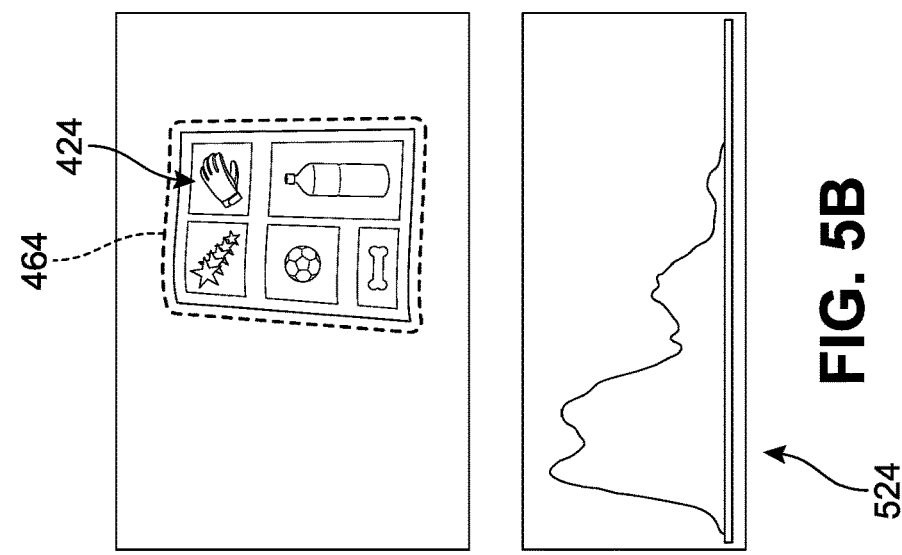
Figure 5A:
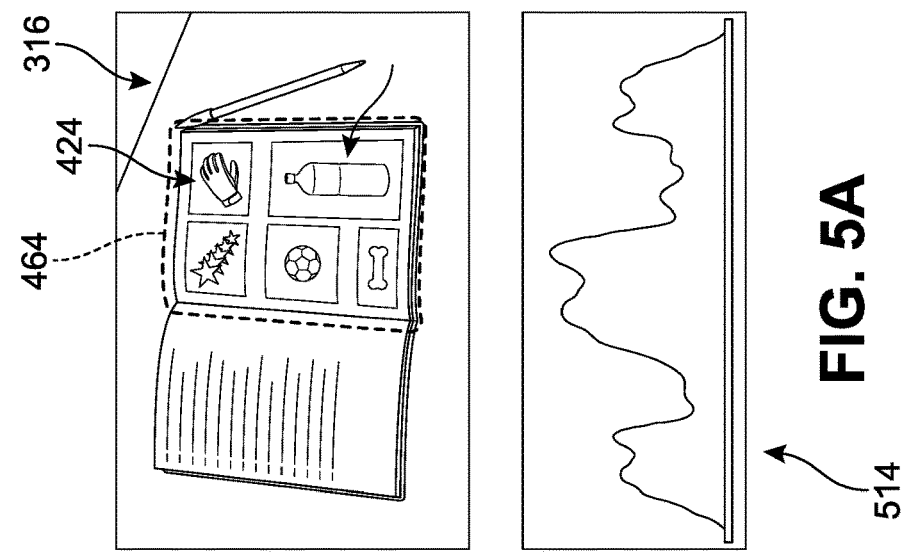

In different implementations, the system can include provisions for determining if subsequent images should be automatically captured as per the selected mode and/or designated target region. In FIGS. 5A-5C, one example of a process by which the system can detect changes in a region of a scene is presented. For purposes of reference, the first image 316 as viewed by the camera lens is shown in FIG. 5A, an isolated view of the first region 424 is shown in FIG. 5B, and an isolated view of the first contextual region 426 is shown in FIG. 5C. It can be appreciated that minimization of the portions of an image file that undergo image processing and/or are stored—even temporarily—can be conducive to faster device operations and improved performance. Thus, in some implementations, the data shown in FIG. 5A associated with the first image 316 as a whole (represented as a first histogram 514) and/or the data shown in FIG. 5C associated with the first contextual region 426 (represented by a third histogram 534) may be optional processing aspects of the auto-capture process. While the first image 316 in its entirety may be stored in the device memory or some other storage for a user, the data generated by the system for purposes of triggering auto-capture can be based on a smaller portion of the file. In other words, the system can be configured to run its processing and/or statistical algorithms on only the user's selected region (here, first region 424), thereby significantly reducing the use of device and system resources. For example, a second histogram 524 in FIG. 5B associated with the first region 424 can be generated as discussed above with reference to FIG. 2, while the remainder of the image (first contextual region 426) can remain unprocessed. The third histogram 534 of FIG. 5C is shown primarily for purposes of illustration in this case, rather than an expression of the actual output of the system. However, in other implementations, the system may also process the image as a whole, or other regions of the image (only one example of which is being shown in FIGS. 5A and 5C), and generate other data that can be stored and/or utilized by the system. In some cases, the first histogram 514 of FIG. 5A may be generated for purposes of helping to determine stability of the camera and/or framed images (see FIG. 6 below).

Figure 6:
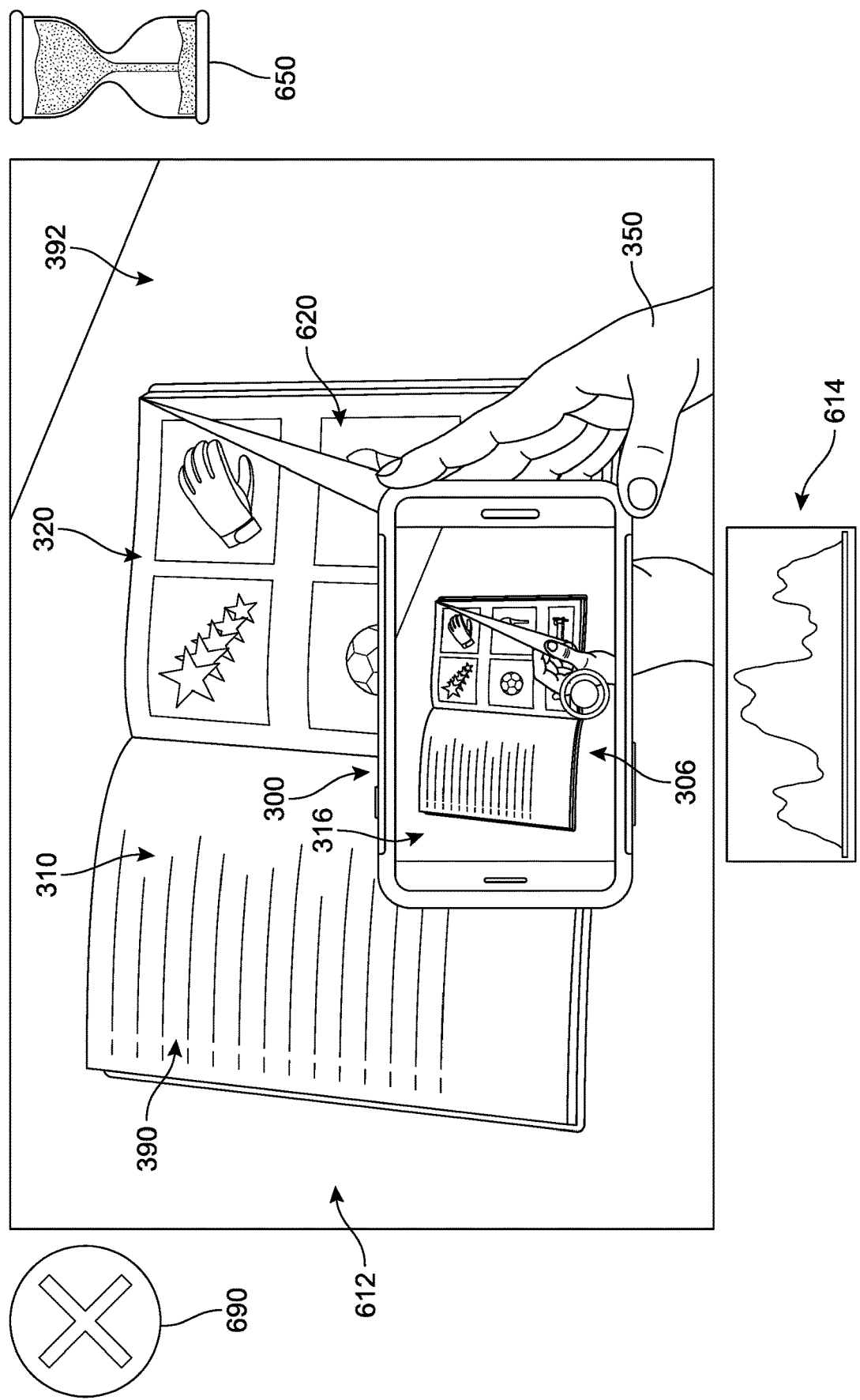
FIGS. 6 and 7 are examples of a user altering a real-world scene while viewing the real-world with an image capture device.

In FIG. 6, at a third time 650 subsequent to the second time 450 of FIG. 4B, the user 350 is shown turning a page of the book 390. In other words, between the second time 450 and the third time 650, the scene being received by the camera has changed. In FIG. 6, the camera optical lens is still generally directed toward the book 390 that is lying on the surface of table 392. The second device 300 is presenting a real-time live preview of a second real-world scene ("second scene") 612, such that the camera is framing the second scene 612 and producing a second image frame ("second image") 616 on the display 306. The second image 616 includes the book 390 (specifically of first left-hand page 310 and a partially obstructed first right-hand page 320) as the user 350 turns the first right-hand page 320. A portion of a second right-hand page 620 can be seen behind the first right-hand page 320.

As noted earlier, in some implementations, systems associated with the application 304 can be configured to detect when scene changes and scene stabilizations occur with respect to a sequence of images. In this case, a fourth histogram 614 is generated for the second image 616 and can be compared with data in the first histogram 514 of FIG. 5A and/or the second histogram 524 of FIG. 5B. As the histogram data is evaluated by the system, a determination that the two images are substantially different can be made based on the statistical analyses discussed earlier (see FIG. 2). In some implementations, as noted above, detection of a scene change can activate a pause or 'hold' in any image capture (represented by an "X" symbol 690), as well as initiate a new workflow toward auto-capture of the next image that includes a stabilized target region.

In addition, in different implementations, the system can include provisions for adjusting the scene stabilization parameters. Scene stability value can be computed using data received from histograms, and/or one or more accelerometers and/or one or more gyroscopes associated with the mobile device. The magnitude of the difference between one histogram and a second histogram can be conceptually viewed as corresponding to the sensitivity for determining whether the scene is stable in one implementation. In other implementations, the threshold value (see FIG. 2) is set to a specific value, but the period of time and/or number of image frames across which any changes or similarities in histogram data must satisfy the threshold value is variable. In such implementations, the variable period of time is used as the scene stability value or as a factor in the scene stability value. In still other implementations, both the threshold value and the time period are adjusted with changes to the scene stability value. Other techniques for determining scene stability and for adjusting the sensitivity of such a determination can also be used with implementations of the disclosed systems. As one non-limiting example, a UI can present an interactive slider that is adjustable between "low" (indicating lower sensitivity, and thus allowing more contrast between two histograms to be tolerated while determining whether the scene is stable or stationary) and "high" (indicating higher sensitivity, and thus allowing for less contrast to be tolerated while determining whether the scene is stable or stationary). In other implementations, the UI can present actual values that may be set by a user.

Figure 7:
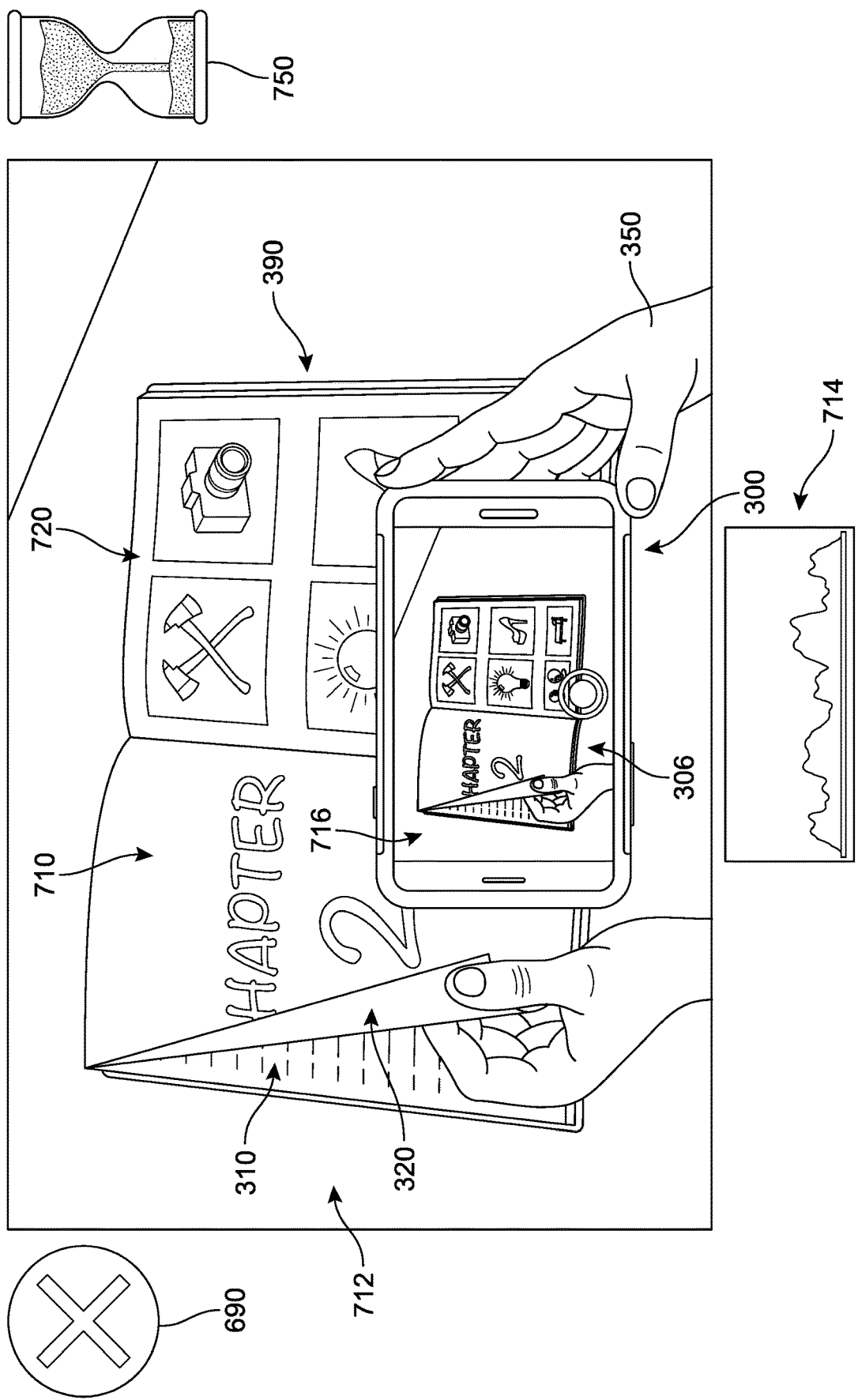

As shown in FIG. 7, at a fourth time 750 subsequent to the third time 650 of FIG. 6, the scene remains in transition. The second device 300 is presenting a real-time live preview of a third real-world scene ("third scene") 712, such that the camera is producing a third image frame ("third image") 716 on the display 306. The third image 716 includes the book 390 (specifically of a partially obstructed second left-hand page 710 and a second right-hand page 720 (the same as second right-hand page 620 in FIG. 6) as the user 350 continues to flip the first right-hand page 320 from the right to left. A portion of the first left-hand page 310 and the first right-hand page 320 can be seen behind the second left-hand page 710. As in FIG. 6, in some implementations, systems associated with the application 304 can detect when scene changes or other instability occur with respect to a sequence of images. In this case, a fifth histogram 714 has been generated for the third image 716 and can be compared with data from the fourth histogram 614 of FIG. 5A and/or histogram or data for other prior images. As the histogram data is evaluated by the system, a determination that the two images are substantially different can be made based on the statistical analysis discussed earlier. In some implementations, as noted above, detection of a scene change can maintain a pause in image capture (represented by an "X" symbol 690), as well as re-initiate a workflow toward auto-capture of the next image. In other examples, as noted earlier, the histograms may only or primarily be generated for the designated target region(s) of the image when determining scene stability and/or scene changes.

Figure 8:
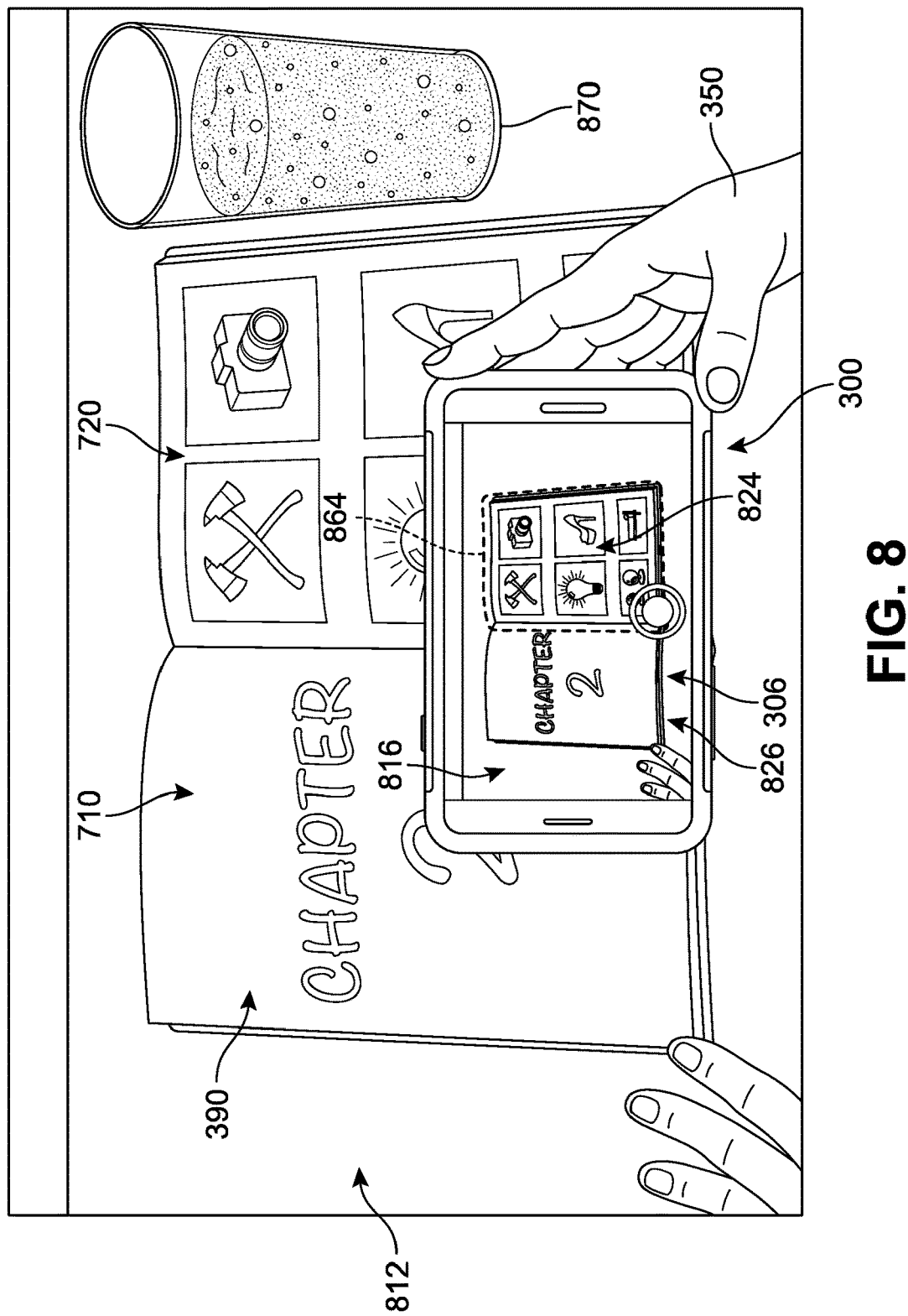
FIG. 8 is an implementation of an automatic detection of a region in an image.

Referring next to FIGS. 8, 9A, and 9B, if the system—upon determining a scene change has a sufficiently high probability of having occurred (as shown in FIGS. 6 and 7)—immediately or shortly thereafter receives information indicating that at least a selected region of a scene in a sequence of images are similar enough to be considered the same scene (i.e., that scene stabilization has occurred), auto-capture can be triggered. In FIG. 8, at a fifth time 850 subsequent to the fourth time 750 of FIG. 7, the page has been turned completely, and a fourth image 816 corresponding to a real-time live preview of a fourth real-world scene ("fourth scene") 812 is being presented on the display 306. In this scene, the device is able to apply edge detection (see above) to identify and delineate a second target region ("second region") 824 that is substantially similar in size, shape, and/or relative position to the first region 424 of FIG. 4, as well as a substantially similar arrangement of edges and/or sides of the regions. The system can determine the two regions correspond to one another based on a variety of parameters, including but not limited to edge quality, edge angles, shape, size, orientation, position relative to external objects, and other characteristics that permit a comparison between the newly detected region and an immediately previous captured or designated region. The display 306 in FIG. 8 further includes an indicator 864 that is associated with or surrounds a second perimeter of the second region 824.

It can be observed that the interior of the second region 824 in the fourth image 816 includes the content (e.g., information) of the second right-hand page 720. For purposes of reference, the remainder of the second image 816 (removing the second region 824) will be identified as a second contextual region 826. Once the region of interest has been (re)detected and confirmed as matching the previously captured or designated region (e.g., first region 424), the system can proceed with evaluating the stability of the image.

Referring next to FIGS. 9A and 9B, in order to determine the relative stability of the particular image target region(s), the fourth image 816 from the fifth time 850 (see FIG. 9A) can be compared with a fifth image 916 that is received at a sixth time 950 subsequent to the fifth time 850 (see FIG. 9B), for example. In FIG. 9B, the device is able to apply edge detection (see above) to identify a third target region ("third region") 924 that corresponds to both the first region 424 of FIG. 4 and the second region 824 of FIG. 9B.

In FIG. 9B, the subsequent fifth image 916 is of a fifth real-world scene that is similar to the fourth scene 812 of FIG. 8, except that a glass of water 870 shown in FIGS. 8 and 9A is no longer apparent, and there has been a minor movement of the user's left hand. However, the interior of each region remains substantially similar. Once the system determines that the interior of the target region has remained stable, it can trigger auto-capture. In order to make this determination, the system can be configured to compare histograms for the target regions between each image, as noted earlier. In FIG. 9A, a sixth histogram 914 for the second region 824 is depicted, as well as—for purposes of illustration—a seventh histogram 924 for the fourth image 816. In addition, in FIG. 9B, an eighth histogram 944 for the third region 924 is depicted, as well as—for purposes of illustration—a ninth histogram 954 for the fifth image 916.

It can be seen in this case that the sixth histogram 914 and the eighth histogram 944 are substantially similar. In this example, the system receives data for these successive frames and determines that there is a sufficiently high probability of the second region 824 and the third region 924 including the same content. Furthermore, the system can be configured to ignore or disregard some or all information associated with any changes that may occur in the contextual regions of each image. In other words, the second contextual region 826 (the image portion(s) external to the second region 824) does in fact differ from a third contextual region 926 (the image portion(s) external to the third region 924) in this example, as reflected by clear differences between the seventh histogram 924 and the ninth histogram 954. However, because the isolated target region (here, second region 824 and third region 924) remained stable, the auto-capture process can proceed.

Figure 10B:
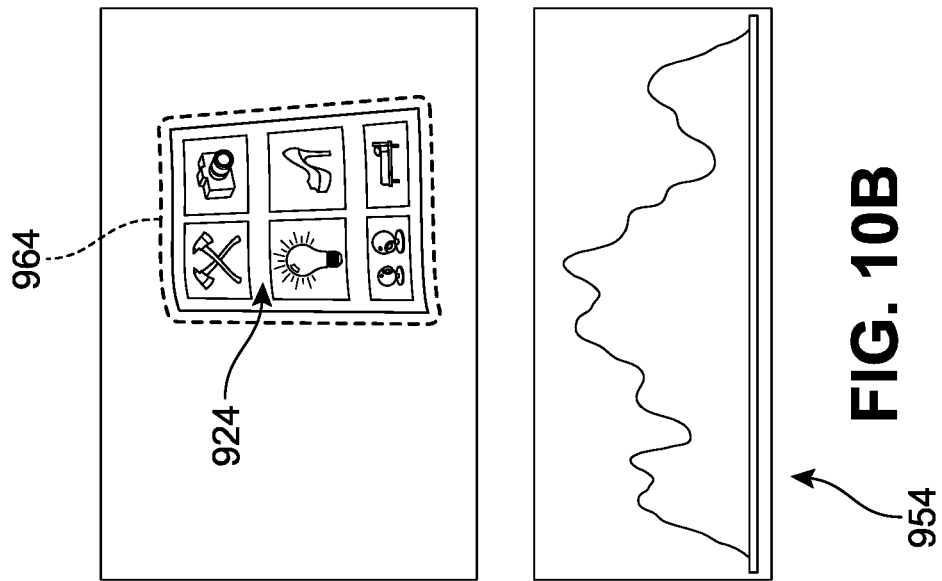
FIGS. 10A and 10B are examples of two detected target regions comprising different information and their corresponding histograms.
Figure 10A:
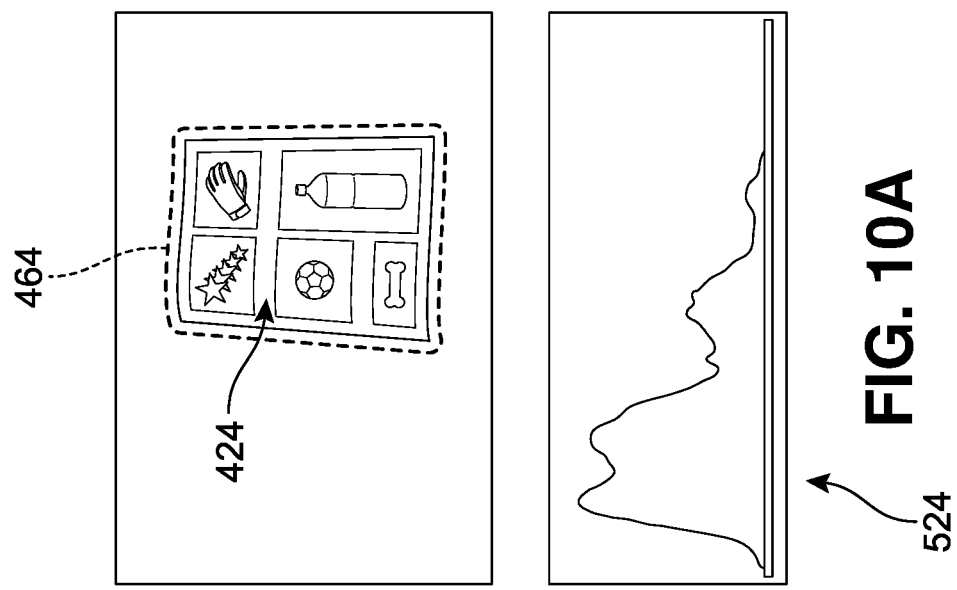

Referring now to FIGS. 10A and 10B, in some implementations, in response to a determination of stability in the designated target region, the system can optionally be further configured to evaluate the previously captured target region (e.g., first region 424) and the target region for the subsequently received image (e.g., second region 824 and/or third region 924) in order to determine whether the two regions are the same or differ. In FIG. 10A, the second histogram 524 (for the first region 424) is presented adjacent to the ninth histogram 954 (for the third region 924) for the reader's convenience. In different implementations, the system can be configured to compare the two (or more) histograms. In this case, it can be observed that the two histograms differ, indicating the interior of the corresponding target regions each include different information. Based on this determination, the system can initiate an auto-capture of at least the target region as presented in the currently received image.

The optional step illustrated in FIGS. 10A and 10B can be of great utility, particularly in scenarios where a user turns a page and then quickly turns the page back to the page just captured, a presenter skips to the next slide unintentionally and briefly before returning to the previous slide (that had already been captured) or some other adjustment that appears to suggest a change in scene occurs, but the target region that is detected displays or otherwise contains the same information as the previously captured image. In some implementations, if the system detects target regions for two images are associated with similar histograms (not shown here), auto-capture may be paused, and/or the user may be asked whether this particular image should nevertheless be captured (with the context that it appears to the system to comprise the same page, slide, quad, etc., as previously captured and stored). However, in other implementations, the system can proceed without further comparison of the previously captured image and the currently received image, and operate with the assumption that any change in scene associated with the target region, followed by a period of stability of the same target region, should immediately trigger an auto-capture.

Figure 11:
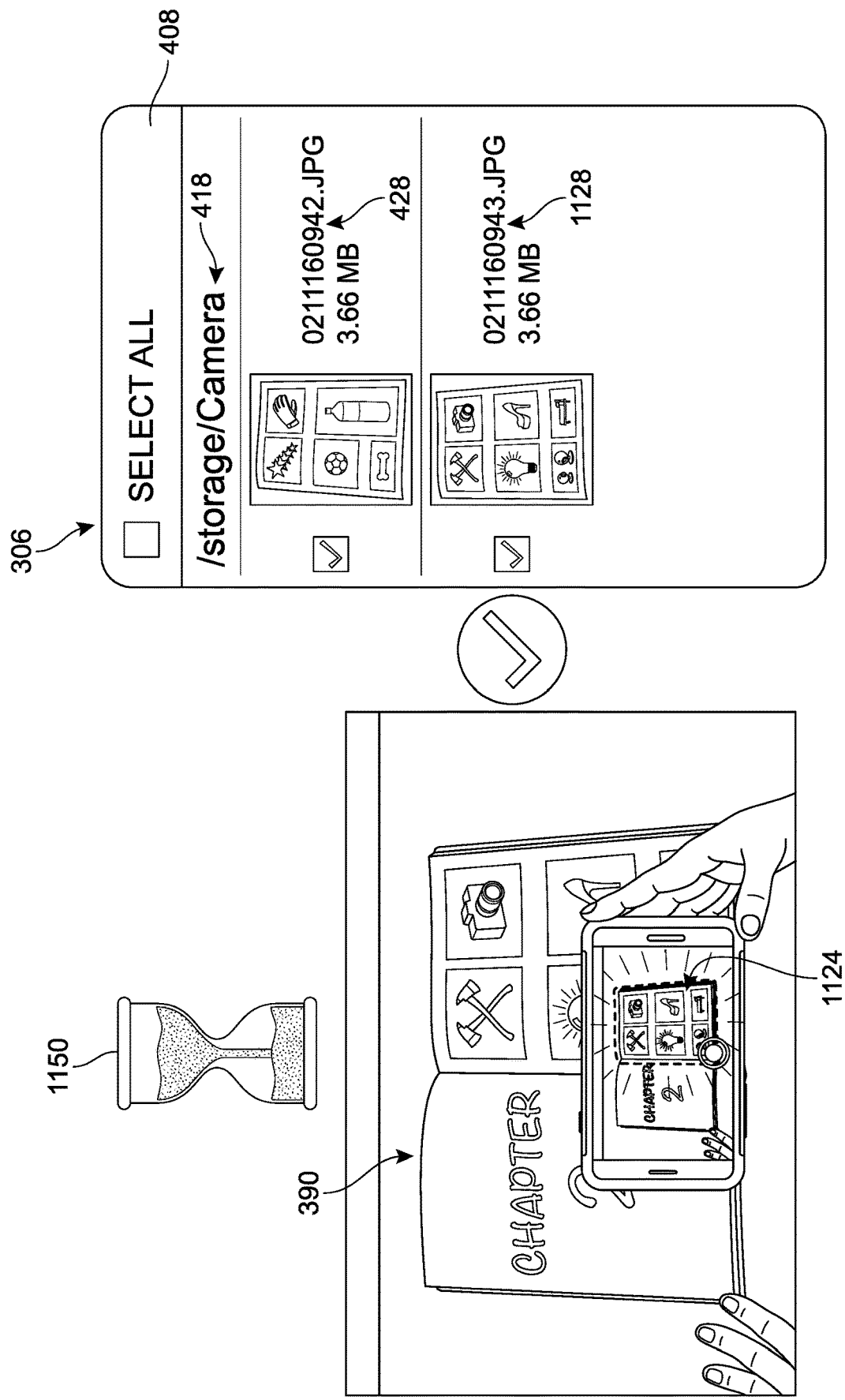
FIG. 11 is an implementation of an automatic image capture and an implementation of a user interface for an application configured to manage image storage.

As shown in FIG. 11, at a seventh time 1150, the system can initiate an automatic capture of the substantially stable target region that followed a detection of a change of scene in at least the target region. In other words, the process of recording a sixth image frame ("sixth image") 1124—here corresponding to the isolated target region—occurs without user input. In addition, in some implementations, the sixth image 1124 can be automatically stored in a designated folder associated with the application 304. In this example, the sixth image 1124 has been saved in a '/storage/Camera' folder 418 as a second auto-captured image 1128, and accessed via a captured images viewing interface 408 on display 306.

Figure 12A:
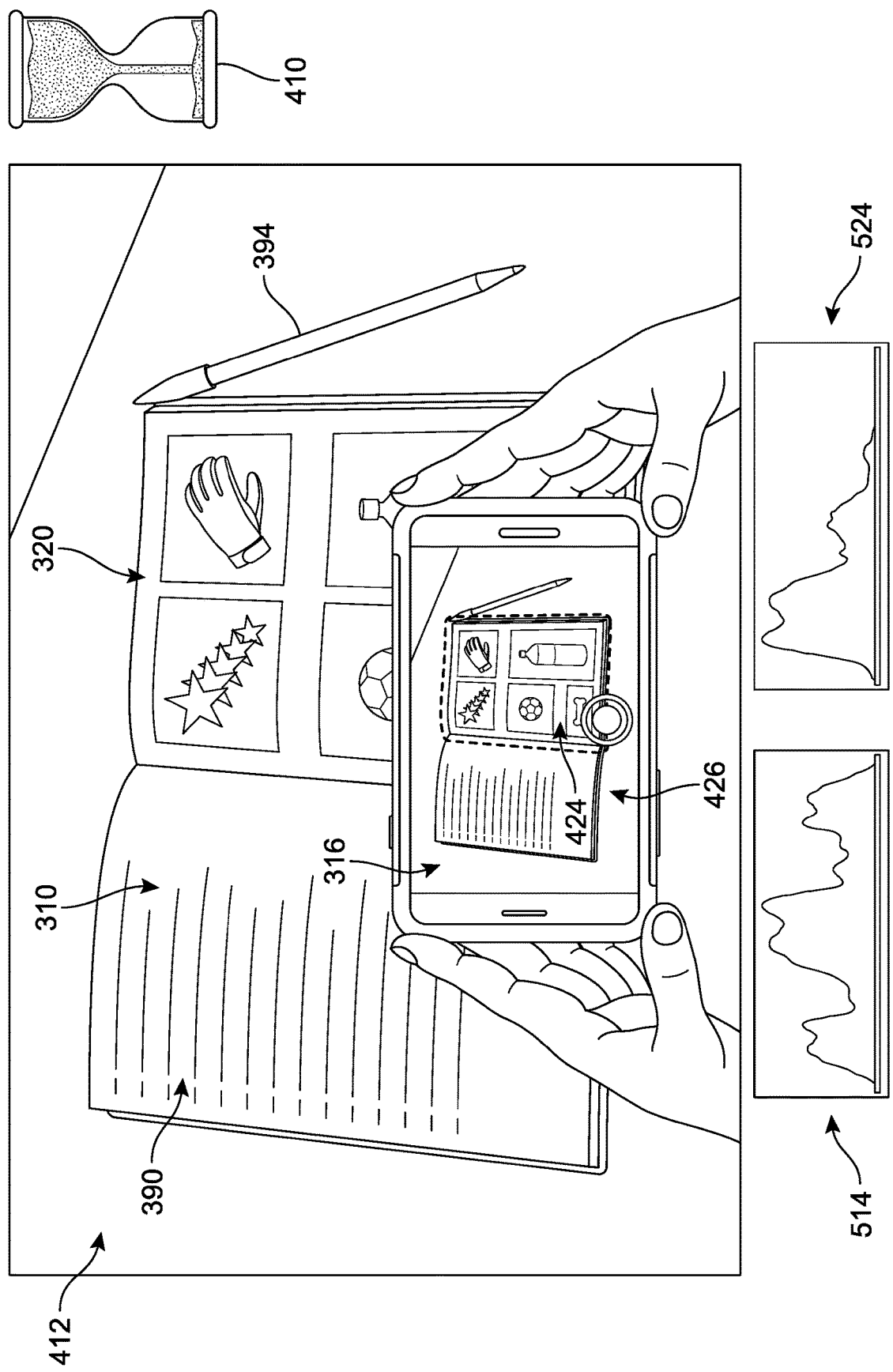
FIGS. 12A and 12B are examples of two real-world scenes in which the target region remains substantially similar, as well as corresponding histograms for each scene.
Figure 12B:
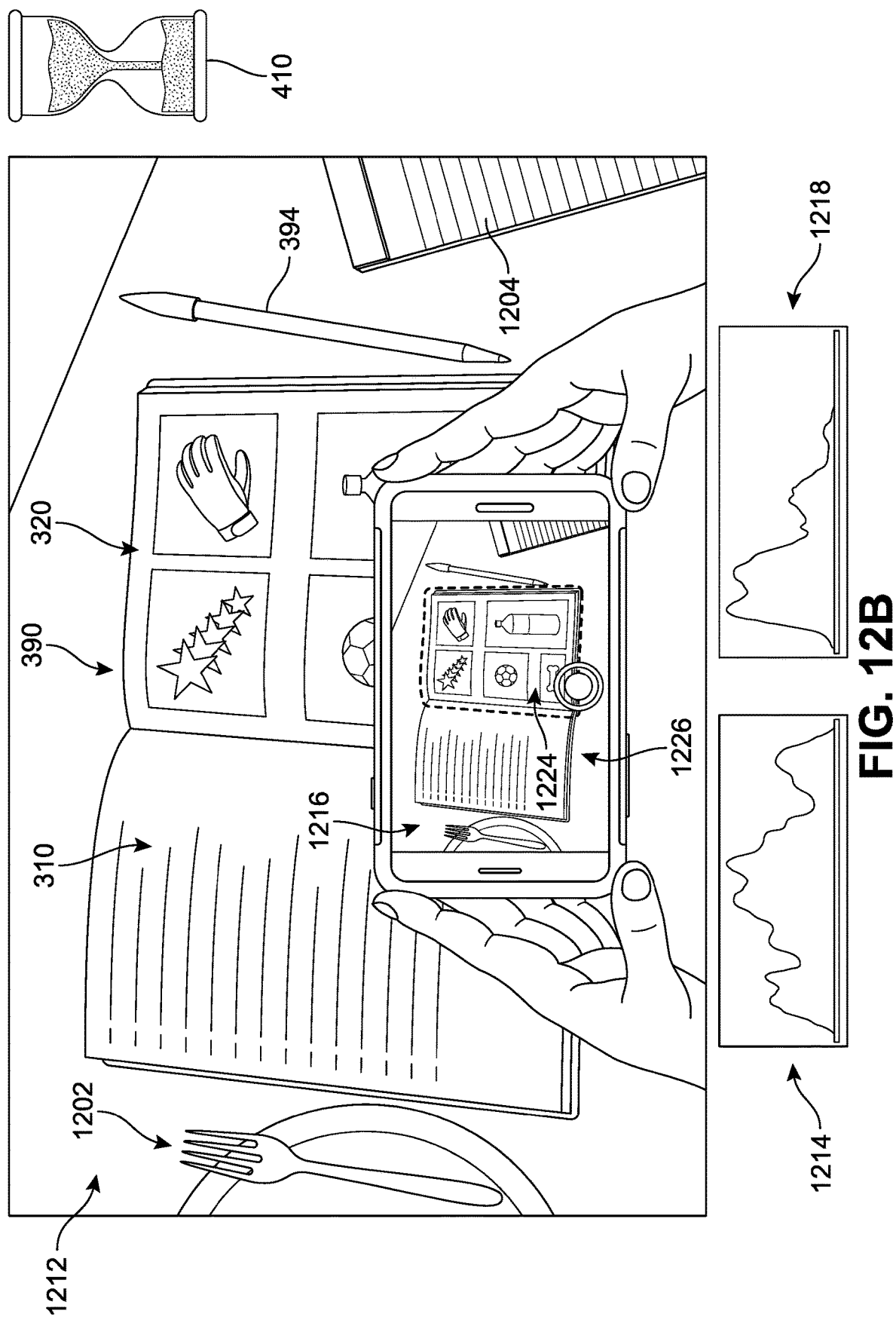

In order to provide the reader with a better sense of some of the features of the proposed implementations, additional examples are now presented. One example is shown with reference to FIGS. 12A and 12B. FIG. 12A depicts the same scene as illustrated previously in FIG. 4A. The first scene 412 is shown with the first left-hand page 310 and the first right-hand page 320. Adjacent to the book 390 is pencil 394, disposed at a first position relative to the book 390. In FIG. 12B, a new, sixth real-world scene ("sixth scene") 1212 is being viewed. In this case, sometime during the period extending between the first time 410 and an eighth time 1210, the objects around book 390 have changed position and/or been modified. In this example, a plate of food 1202 and a notebook 1204 have been placed near the book 390. In addition, the pencil 394 is now disposed at a second, different position relative to the book 390.

In different implementations, these changes can be detected by the system. In FIG. 12A, the histogram 514 associated with the first image 316 can be compared with a tenth histogram 1214 associated with the eighth image 1216, and a scene change identified. However, despite a change in information being received between the first image 316 and an eighth image 1216, the auto-capture process may remain dormant or deactivated. This is explained by reference to the histograms below each of the drawings, directed to the target region in each image. In comparing the second histogram 524 associated with the first region 424 (FIG. 12A) with an eleventh histogram 1218 associated with a corresponding fourth region 1224 (FIG. 12B), it can be observed that the two histograms are substantially similar. In other words, the interior of each target region continues to show the same content. Thus, though the two images are different, no change is detected in the two target regions. In such cases, an auto-capture process for the 'next' page will not yet be triggered, despite changes in contextual content.

In some implementations, the system can include provisions for adjusting the number of photos taken while the device is in auto-capture mode. As one example, when the computing device is operating in auto-capture mode, the system can be configured to automatically capture images in a substantially continuous operation until the auto-capture mode is deactivated or has captured a predetermined number of images. In another implementation, the system can be configured to change the length of a pause between auto-capture mode activation and image capture and storing. For example, when the device is first set in auto-capture mode, image capturing and storage may be momentarily suspended so that the user can orient the camera into the direction of the intended subject.

The example criteria and parameters described herein should not be construed as limiting, as fewer criteria can be used or additional criteria added. In general, any combination or sub-combination of image capture criteria can be used as thresholds for triggering automatic image capture and can be adjustable through an auto-capture mode settings screen. In addition, once the desired image capture criteria are set, the user can exit the auto-capture mode settings screen.

Figure 13B:
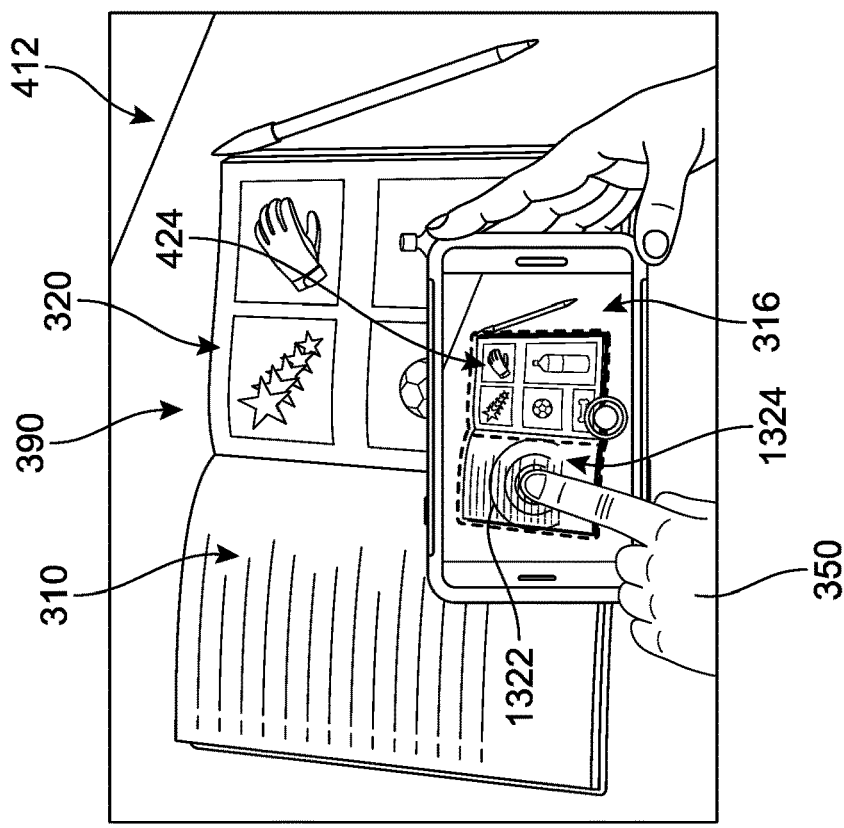
FIGS. 13A-13C show an implementation of a multi-regional detection feature for auto-capture.
Figure 13A:
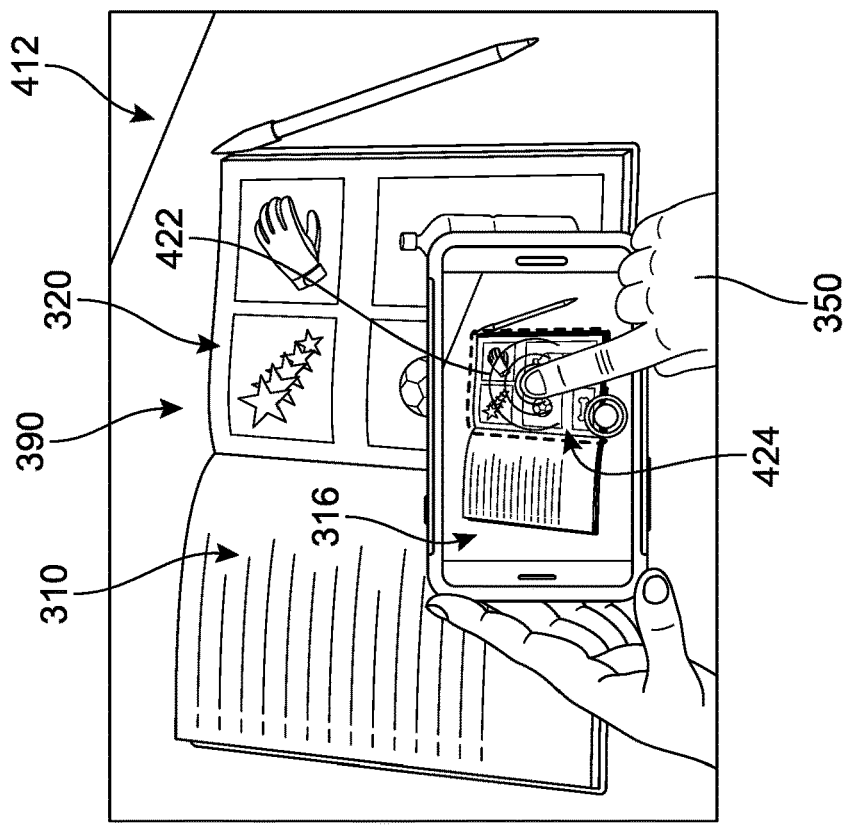
Figure 13C:
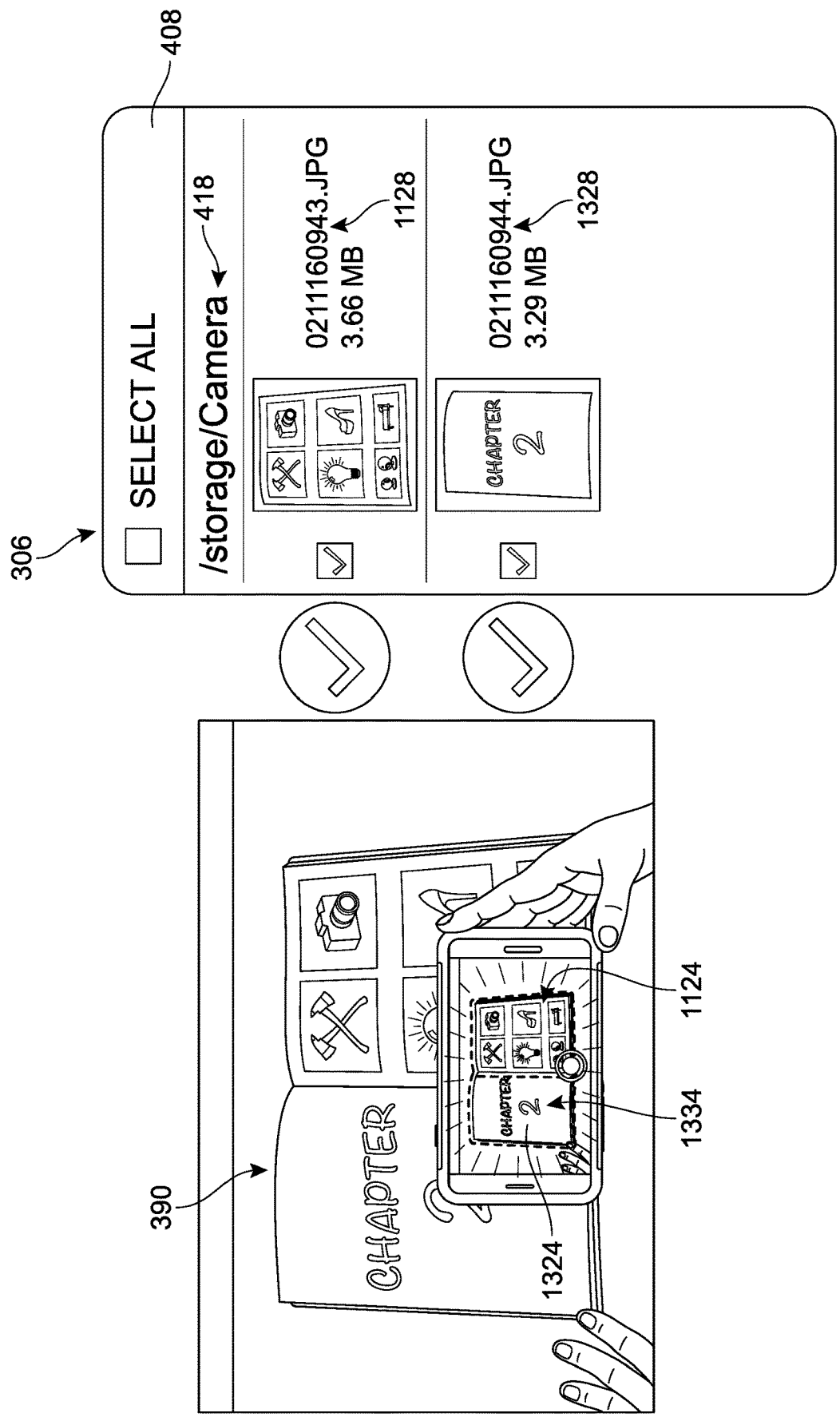

Another example illustrating a functionality of some of the proposed systems is shown with reference to FIGS. 13A-13C. In FIG. 13A, the same scene as illustrated previously in FIG. 4A is depicted. The first scene 412 is shown with the first left-hand page 310 and the first right-hand page 320. Furthermore, the user 350 is shown providing a first user input, via a touch to first zone 422 of the first image 316. In some implementations, such an input is received by the application as representing an indication of the user's desired target region. In response, the system can detect whether there are any other possible scannable regions (candidates) associated with the area of the image that has been selected. In this case, the application detects the first region 424 that includes the first zone 422 (corresponding to the location of the first user input). It can be observed that the first region 424 in the first image 316 includes the interior content of the first right-hand page 320.

Next, in FIG. 13B, essentially the same scene is shown. However, the user 350 is also shown providing a second user input, via a touch to a second zone 1322 of the first image 316. As noted above, such an input can be received by the system as representing an indication of the user's desired target region. In response, the system can detect whether there are any other possible scannable regions associated with the area of the image that has been selected. In this case, the application detects a fifth region 1324 that includes the second zone 1322 (corresponding to the location of the second user input). It can be observed that the fifth region 1324 in the first image 316 includes the interior content of the first left-hand page 310. Thus, a user is able to request image capture of multiple regions or quads in an image. The user selection of multiple target regions in one image can be used by the system to detect the corresponding target regions across a subsequent sequence of images in the same manner as described above. The auto-capture can be triggered and used to capture more than one region (e.g., multiple regions captured from a single frame) following scene changes, and stored as individual image files.

A possible scenario resulting from these selections (i.e., first region 424 and fifth region 1324) is presented in FIG. 13C. The system is shown initiating an automatic capture of the substantially stable target regions that followed a detection of a change of scene in at least one of the target regions. In other words, the process of recording the sixth image 1124—here corresponding to the first target region, as well as the process of recording a seventh image frame ("seventh image") 1334—occurs without user input. The capture of the sixth image 1124 can occur in response to a detection of a change in the image corresponding to the first region, and the capture of the seventh image 1334 can occur in response to a detection of a change in the image corresponding to the fifth region 1324. In addition, in some implementations, the sixth image 1124 and the seventh image 1334 can be automatically stored in the same designated folder. In this example, both images have been saved in a '/storage/Camera' folder 418 as the second auto-captured image 1128 and a third auto-captured image 1328.

It can be appreciated that the implementations described herein may be applicable not only to static images, but to video as well. As an example, a user may access auto-capture functions via an image capture application on a computing device that may or may not include a camera. The user can further access a stored or live video or other multimedia streams and select the appropriate auto-capture mode via the settings menu for the application. This type of 'offline' user experience can be applied to capture a series or sequence of slides or other region-based information within each frame of the video as the content in the region changes from one video frame to the next. Thus, it should be understood that though the illustrations have depicted the use of the system with static images, any of the proposed implementations may be configured for auto-capture of images from video or any other type of visual media.

Figure 14:
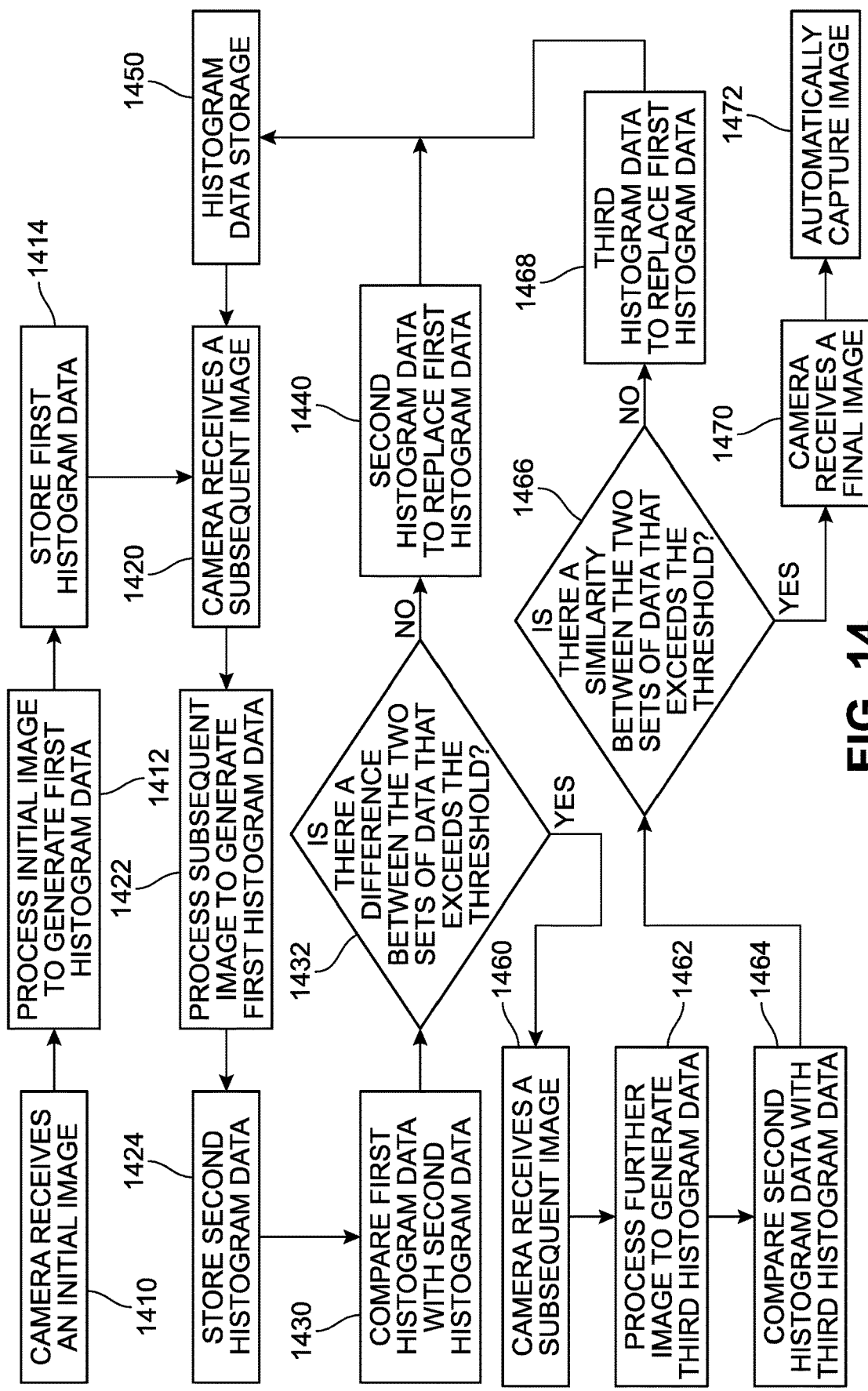
FIG. 14 is a process flow diagram of an implementation for an automatic image capture tool.

For purposes of clarity, FIG. 14 illustrates one implementation of a process for initiating an auto-capture on a camera via some of the systems described herein. It should be understood that the implementation of this process will be configured to occur mainly as a result of a user selection of auto-capture mode. In this example, a first stage 1410 includes the receipt of an initial image by a camera. For example, the image can be a live preview of the scene being projected through the optical lens of the camera, and can be shown to a user on a display for a device, usually via an image capture application being accessed or executed by the device. It should be understood that references to the term "image" in this context also encompass the smaller, target regions, as discussed above. In a second stage 1412, the system can process the initial image to generate a first set of histogram data. In some implementations, this processing requires a minimal use of the device processors and memory, as the focus of the image processing can be limited to one color channel (e.g., "Y"). The first histogram data can be stored in a histogram data storage module in a third stage 1414.

In a fourth stage 1420, the camera receives another image, which for purposes of simplicity will be referred to as a "subsequent image". This subsequent image is processed in a fifth stage 1422 to generate a second set of histogram data. This data can be stored in the histogram data storage module in a sixth stage 1424. It should be understood that the gap or interval of time and/or number of frames received between the initial image and the subsequent image can vary widely as per user preferences and system settings. Thus, while the initial image and the subsequent image can be configured to immediately follow one another, in other implementations they may be spaced apart by several seconds or milliseconds or less, and/or by a particular number of frames that are received by the camera optical system in which histogram data is not generated.

In a seventh stage 1430, the system accesses the histogram data storage module 1450 and—as discussed earlier—compares the first set of data with the second set of data. If (eighth step 1432) a determination is made that there is a difference between the two sets of data that exceeds a pre-established or predefined threshold, or otherwise indicates a sufficient probability that the two sets represent substantially different images (e.g., change of scene), the system can continue on the path toward auto-capture. If instead the comparison indicates that there is little difference between the two sets of data, and the two images are likely representing the same (or substantially similar) scene, the system can be configured to move the second set of data up in the queue. In other words (ninth stage 1440), the second set of histogram data can replace or become substituted for the first set of histogram data for purposes of this flow diagram. Thus, along this path direction, references to the first set of histogram data will be referring to the data generated for an image prior to the receipt of the next subsequent image.

Returning to the previous stage and successful difference determination, as the auto-capture process continues to progress, the camera can receive another image (tenth stage 1460), which for purposes of simplicity will be referred to as a "further image". This further image is processed in an eleventh stage 1462 to generate a third set of histogram data. The third set of data can be optionally stored in the histogram data storage module; however, in some other cases, the third set of data can be held in current memory until the next determination is made. It should be understood that the gap or interval of time and/or number of frames received between the subsequent image and the further image can vary widely as per user preferences and system settings. Thus, while the subsequent image and the further image can be configured to immediately follow one another, in other implementations they may be spaced apart by several seconds or milliseconds or less, and/or by a particular number of frames that are received by the camera optical system in which histogram data is not generated.

In a twelfth stage 1464, the system accesses the histogram data storage module 1450 and compares the second set of data with the third set of data. If (thirteenth step 1466) a determination is made that the two sets of data are similar to a degree that exceeds a pre-established or predefined threshold, or otherwise indicates a sufficient probability that the two sets represent substantially similar images (e.g., images representing the same scene), the system can continue on the path toward auto-capture. If instead the comparison indicates that there is a difference between the two sets of data that exceeds a pre-established or predefined threshold, or otherwise indicates a sufficient probability that the two sets represent substantially different images (e.g., change of scene), the system can be configured to move the third set of data up in the queue. In other words (fourteenth stage 1468), the third set of histogram data can replace or become substituted for the first set of histogram data for purposes of this flow diagram. Thus, along this path direction, references to the first set of histogram data will be referring to the data generated for an image prior to the receipt of another subsequent image.

Returning to the previous stage and successful similarity determination, as the auto-capture process continues to progress, the camera can receive another image (fifteenth stage 1470), which for purposes of simplicity will be referred to as a "final image". This final image is automatically captured by the camera. The process can continue to repeat or cycle to capture a series of images that are received following detection of a scene change followed by a scene stabilization.

Figure 15:
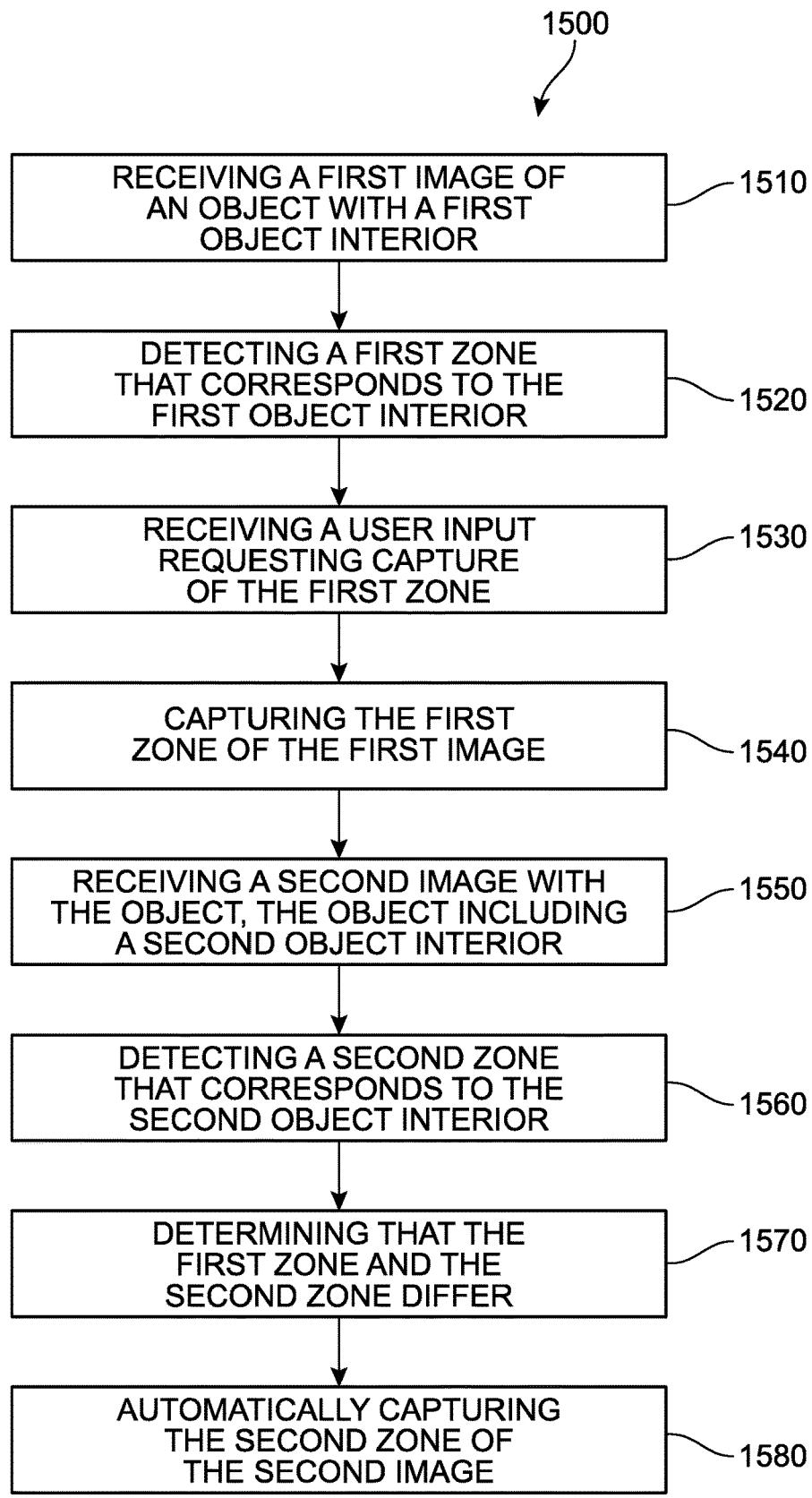
FIG. 15 is a flow diagram illustrating an implementation of a process for managing automatic image capture.

FIG. 15 is a flow chart illustrating an implementation of a method 1500 of managing the automatic capture of images. In FIG. 15, a first step 1510 includes receiving a first image corresponding to a first real-world scene that includes a first object, the first object including a first object interior, followed by a second step 1520 of automatically detecting, within the first image, a first zone that corresponds to the first object interior. In a third step 1530 the method includes receiving a first user input requesting an image capture of at least the first zone. A fourth step 1540 involves capturing, at a first time, at least the first zone of the first image in response to receiving the first user input. In addition, a fifth step 1550 includes receiving, at a second time subsequent to the first time, a second image corresponding to a second real-world scene that includes the first object, the first object including a second object interior. The method also includes a sixth step 1560 of automatically detecting, within the second image, a second zone that corresponds to the second object interior. A seventh step 1570 of the method involves determining that the first zone and the second zone differ by at least a first minimum amount based in part on a comparison between the first zone and the second zone, and an eighth step 1580 includes automatically capturing at least the second zone of the second image based in part on determining that the first zone and the second zone differ.

In other implementations, the method can include additional or alternate steps. For example, the method may further include generating a first histogram for the first zone of the first image, generating a second histogram for the second zone of the second image. In some cases, determining that the first zone differs from the second zone is based at least on a comparison of the first histogram with the second histogram. In addition, in some implementations, the first histogram identifies a first number of pixels associated with a first luminance value, and the second histogram identifies a second number of pixels associated with the first luminance value, and the method further comprises determining that the first number of pixels differs from the second number of pixels by at least the first amount. In another example, the method also includes determining that a first shape of the first outer boundary is substantially similar to a second shape of the second outer boundary. In some cases, automatically capturing at least the second zone of the second image is based in part on determining that the first shape is substantially similar to the second shape.

Furthermore, in some implementations, the method may involve automatically detecting, within the first image, a third zone that corresponds to a remainder of the first image outside of the first zone. In addition, the method can include automatically detecting, within the second image, a fourth zone that corresponds to a remainder of the second image outside of the second zone, as well as determining that the third zone and fourth zone are substantially similar based in part on a comparison between the third zone and the fourth zone. In some cases, automatically capturing at least the third zone of the second image is based in part on determining that the third zone and the fourth zone are substantially similar.

As another example, the method may include generating a first histogram for the third zone of the first image, generating a second histogram for the fourth zone of the second image. In some cases, determining that the third zone and the fourth zone are substantially similar is based at least on a comparison of the first histogram with the second histogram. In another scenario, the first histogram identifies a first number of pixels associated with a first luminance value, and the second histogram identifies a second number of pixels associated with the first luminance value, and the method further comprises determining that the first number of pixels differs from the second number of pixels by at most a predetermined percentage.

In some implementations, the first object is one of a book, a projector screen, an electronic device display, and a television. In another example, the first image corresponds to a first clip of a first video file and the second image corresponds to a second clip of the first video file. In different implementations, the time between a first time and a second time, or the second time and a third time, can vary in order to accommodate the likely durations between changes in the object interior. For example, a switch from one slide to the next slide can range between a few seconds to several minutes or longer. Typically, a flipping of pages as one scans a series of pages in a book can range between 2-20 seconds, though it can certainly take longer if the user needs to locate a specific page or is not sure which page to scan next. In such cases, the selection the appropriate mode can be of great benefit, as each mode is configured to provide the optimal auto-capture user experience for the specified image type. In some implementations, a user may also be offered a mode that allows selection of a full-image auto-capture mode, a salient quad detected near the center of the image, or some other quad nearest to a selected point in the image.

In some examples, the method further includes receiving a third image corresponding to a third real-world scene that includes a second object and a third object, the second object including a third object interior, the third object including a fourth object interior, as well as automatically detecting, within the first image, a third zone that corresponds to the third object interior and a fourth zone that corresponds to the fourth object interior. In addition, the method can include receiving a second user input requesting an image capture of the third zone, capturing, at a third time, the third zone of the first image in response to receiving the second user input, and receiving a third user input requesting an image capture of the fourth zone. Furthermore, the method can include capturing, at a fourth time subsequent to the third time, the fourth zone of the first image in response to receiving the third user input, as well as receiving, at a fifth time subsequent to the fourth time, a fourth image corresponding to a fourth real-world scene that includes the second object and the third object, the second object including a fifth object interior, the third object including a sixth object interior. The method can further include automatically detecting, within the fourth image, a fifth zone that corresponds to the fifth object interior and a sixth zone that corresponds to the sixth object interior. Additional steps can include determining that the third zone and the fifth zone differ by at least the first amount based in part on a comparison between the third zone and the fifth zone, and automatically capturing at least the fifth zone of the second image based in part on determining that the third zone and the fifth zone differ.

In another example, the method can also include determining, based in part on a comparison between the fourth zone and the sixth zone, that the fourth zone and the sixth zone differ by at least the first amount, and automatically capturing, based in part on determining that the fourth zone and the sixth zone differ, at least the sixth zone of the second image. In addition, in some cases, the method includes storing the captured fifth zone as a first file and storing the captured sixth zone as a second file. These files may be located in the same folder. In some other implementations, the method can include determining that the first zone and the third zone are associated with a first spatial arrangement relative to one another, and also determining that the second zone and the fourth zone are associated with a second spatial arrangement relative to one another. In some cases, automatically capturing at least the second zone of the second image is based in part on determining that the first spatial arrangement and the second spatial arrangement are substantially similar.

Thus, the use of the disclosed systems and methods can enable users to easily tap to select a point in an image and in response provide one or more quad candidates that are identified as having that point in their interior. If a user taps at multiple places in succession, he or she will be presented with multiple quads in succession. The ability to deliberately select one or more regions in an image for scanning, both in real-time image capture and in stored images, offers a wide range of benefits to users. This feature substantially reduces the time needed to scan various items; rather than attempting to re-capture or modify images to obtain the desired region, a user may submit an input indicating a target locus that is present in the desired region, and the application can then automatically detect region(s) that include the target locus. Furthermore, by offering users a simple means by which to select multiple, discrete regions for scanning within a single image, multiple images need not be collected or stored to obtain the scans, and the process will occur over a much shorter duration.

For the sake of simplicity of description, details are not provided herein for performing various image processing steps. Implementations of the present disclosure can make use of any of the features, systems, components, devices, and methods described in U.S. Pat. No. 9,516,227 to Chau, et al., issued on Dec. 6, 2016 and entitled "Camera non-touch switch"; U.S. Pat. No. 6,965,645 to Zhang et al., issued on Nov. 15, 2005 and entitled "Content-based characterization of video frame sequences"; U.S. Pat. No. 7,408,986 to Winder, issued on Aug. 5, 2008 and entitled "Increasing motion smoothness using frame interpolation with motion analysis"; U.S. Patent Publication Number 2017/0140250 to Maloney et al., published on May 18, 2017 and entitled "Content file image analysis"; U.S. Pat. No. 9,596,398 to Khawand, issued on Mar. 14, 2017 and entitled "Automatic image capture"; and U.S. patent application Ser. No. 16/127,209 to Agarwal, filed on Sep. 10, 2018 and entitled "Multi-Region Detection For Images" the disclosures of each of which are herein incorporated by reference in their entirety.

The detailed examples of systems, devices, and techniques described in connection with FIGS. 1-15 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-15 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 16:
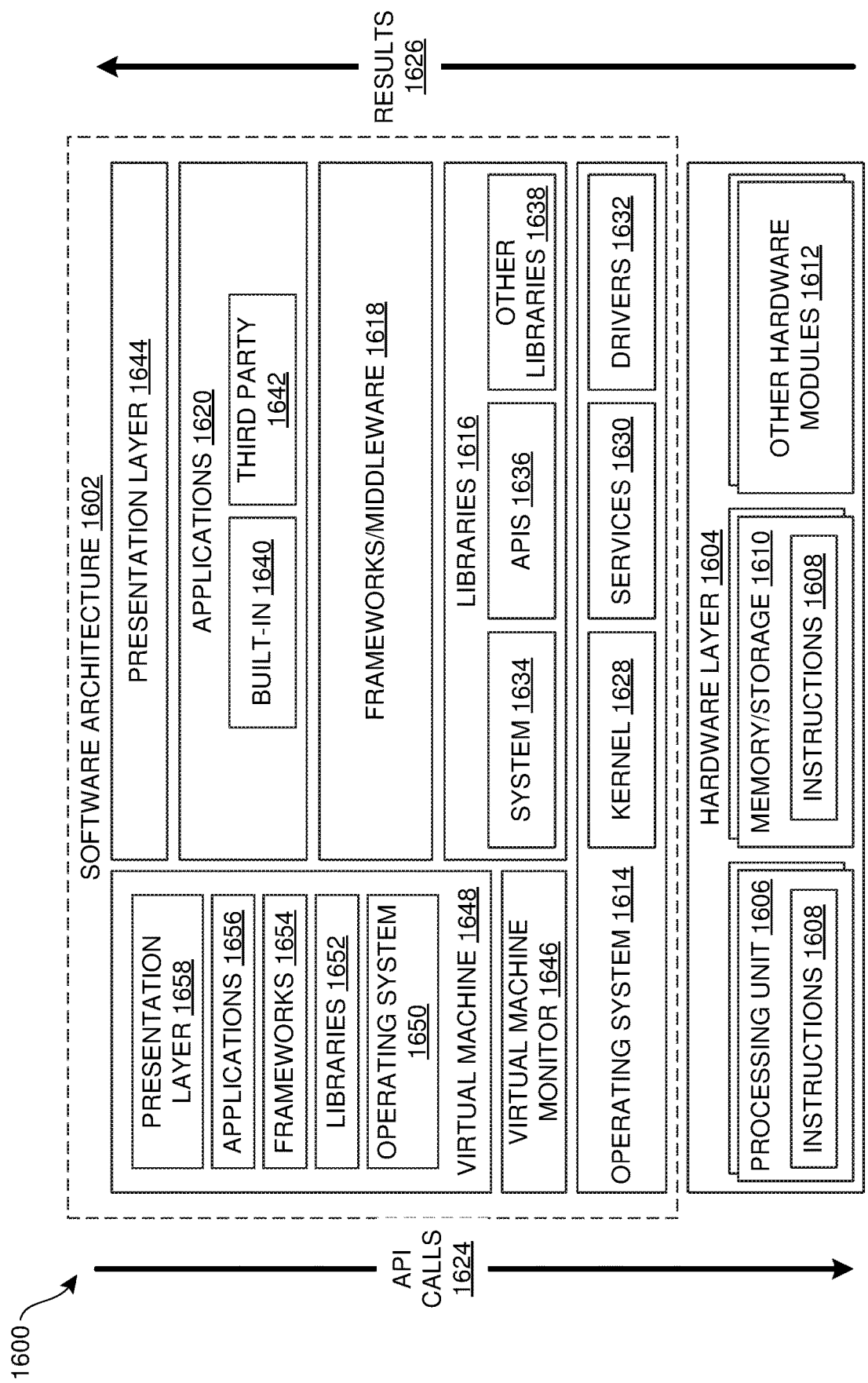
FIG. 16 is a block diagram of an example computing device, which may be used to provide implementations of the mechanisms described herein.

FIG. 16 is a block diagram 1600 illustrating an example software architecture 1602, various portions of which may be used in conjunction with various hardware architectures herein described, which may implement any of the above-described features. FIG. 16 is a non-limiting example of a software architecture and it will be appreciated that many other architectures may be implemented to facilitate the functionality described herein. The software architecture 1602 may execute on hardware such as a first device 102 of FIG. 1A and second device 300 of FIG. 3A that include, among other things, document storage 1070, processors, memory, and input/output (I/O) components. A representative hardware layer 1604 is illustrated and can represent, for example, the devices described herein. The representative hardware layer 1604 includes a processing unit 1606 and associated executable instructions 1608. The executable instructions 1608 represent executable instructions of the software architecture 1602, including implementation of the methods, modules and so forth described herein. The hardware layer 1604 also includes a memory/storage 1610, which also includes the executable instructions 1608 and accompanying data. The hardware layer 1604 may also include other hardware modules 1612. Instructions 1608 held by processing unit 1608 may be portions of instructions 1608 held by the memory/storage 1610.

The example software architecture 1602 may be conceptualized as layers, each providing various functionality. For example, the software architecture 1602 may include layers and components such as an operating system (OS) 1614, libraries 1616, frameworks 1618, applications 1620, and a presentation layer 1644. Operationally, the applications 1620 and/or other components within the layers may invoke API calls 1624 to other layers and receive corresponding results 1626. The layers illustrated are representative in nature and other software architectures may include additional or different layers. For example, some mobile or special purpose operating systems may not provide the frameworks/middleware 1618.

The OS 1614 may manage hardware resources and provide common services. The OS 1614 may include, for example, a kernel 1628, services 1630, and drivers 1632. The kernel 1628 may act as an abstraction layer between the hardware layer 1604 and other software layers. For example, the kernel 1628 may be responsible for memory management, processor management (for example, scheduling), component management, networking, security settings, and so on. The services 1630 may provide other common services for the other software layers. The drivers 1632 may be responsible for controlling or interfacing with the underlying hardware layer 1604. For instance, the drivers 1632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1616 may provide a common infrastructure that may be used by the applications 1620 and/or other components and/or layers. The libraries 1616 typically provide functionality for use by other software modules to perform tasks, rather than rather than interacting directly with the OS 1614. The libraries 1616 may include system libraries 1634 (for example, C standard library) that may provide functions such as memory allocation, string manipulation, file operations. In addition, the libraries 1616 may include API libraries 1636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1616 may also include a wide variety of other libraries 1638 to provide many functions for applications 1620 and other software modules.

The frameworks 1618 (also sometimes referred to as middleware) provide a higher-level common infrastructure that may be used by the applications 1620 and/or other software modules. For example, the frameworks 1618 may provide various graphic user interface (GUI) functions, high-level resource management, or high-level location services. The frameworks 1618 may provide a broad spectrum of other APIs for applications 1620 and/or other software modules.

The applications 1620 include built-in applications 1640 and/or third-party applications 1642. Examples of built-in applications 1640 may include, but are not limited to, a contacts application, a browser application, a location application, a media application, a messaging application, and/or a game application. Third-party applications 1642 may include any applications developed by an entity other than the vendor of the particular platform. The applications 1620 may use functions available via OS 1614, libraries 1616, frameworks 1618, and presentation layer 1644 to create user interfaces to interact with users. Some software architectures use virtual machines, as illustrated by a virtual machine 1648.

The virtual machine 1648 provides an execution environment where applications/modules can execute as if they were executing on a hardware machine (such as the machine 1000 of FIG. 10, for example). The virtual machine 1648 may be hosted by a host OS (for example, OS 1614) or hypervisor, and may have a virtual machine monitor 1646 which manages operation of the virtual machine 1648 and interoperation with the host operating system. A software architecture, which may be different from software architecture 1602 outside of the virtual machine, executes within the virtual machine 1648 such as an OS 1650, libraries 1652, frameworks 1654, applications 1656, and/or a presentation layer 1658.

Figure 17:
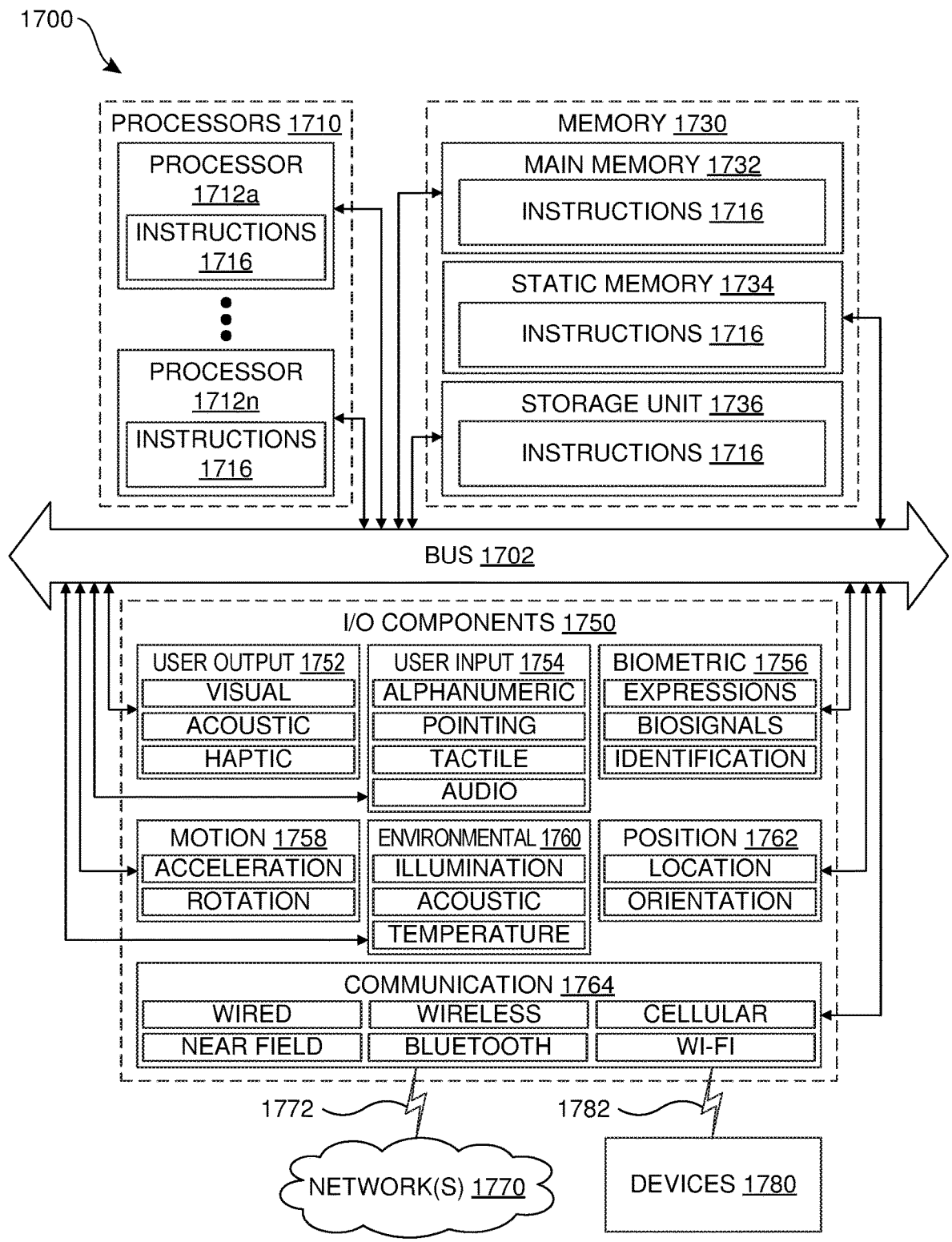
FIG. 17 is a block diagram illustrating components of an example machine configured to read instructions from a machine-readable medium.

FIG. 17 is a block diagram illustrating components of an example machine 1700 configured to read instructions from a machine-readable medium (for example, a machine-readable storage medium) and perform any of the features described herein. The example machine 1700 is in a form of a computer system, within which instructions 1716 (for example, in the form of software components) for causing the machine 1700 to perform any of the features described herein may be executed. As such, the instructions 1716 may be used to implement modules or components described herein. The instructions 1716 cause unprogrammed and/or unconfigured machine 1700 to operate as a particular machine configured to carry out the described features. The machine 1700 may be configured to operate as a standalone device or may be coupled (for example, networked) to other machines. In a networked deployment, the machine 1700 may operate in the capacity of a server machine or a client machine in a server-client network environment, or as a node in a peer-to-peer or distributed network environment. Machine 1700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1700 is illustrated, the term "machine" includes a collection of machines that individually or jointly execute the instructions 1716.

The machine 1700 may include processors 1710, memory 1730, and I/O components 1750, which may be communicatively coupled via, for example, a bus 1702. The bus 1702 may include multiple buses coupling various elements of machine 1700 via various bus technologies and protocols. In an example, the processors 1710 (including, for example, a central processing unit (CPU), a graphics processing unit (GPU), a digital signal processor (DSP), an ASIC, or a suitable combination thereof) may include one or more processors 1712a to 1712n that may execute the instructions 1716 and process data. In some examples, one or more processors 1710 may execute instructions provided or identified by one or more other processors 1710. The term "processor" includes a multi-core processor including cores that may execute instructions contemporaneously. Although FIG. 17 shows multiple processors, the machine 1700 may include a single processor with a single core, a single processor with multiple cores (for example, a multi-core processor), multiple processors each with a single core, multiple processors each with multiple cores, or any combination thereof. In some examples, the machine 1700 may include multiple processors distributed among multiple machines.

The memory/storage 1730 may include a main memory 1732, a static memory 1734, or other memory, and a storage unit 1736, both accessible to the processors 1710 such as via the bus 1702. The storage unit 1736 and memory 1732, 1734 store instructions 1716 embodying any one or more of the functions described herein. The memory/storage 1730 may also store temporary, intermediate, and/or long-term data for processors 1710. The instructions 1716 may also reside, completely or partially, within the memory 1732, 1734, within the storage unit 1736, within at least one of the processors 1710 (for example, within a command buffer or cache memory), within memory at least one of I/O components 1750, or any suitable combination thereof, during execution thereof. Accordingly, the memory 1732, 1734, the storage unit 1736, memory in processors 1710, and memory in I/O components 1750 are examples of machine-readable media.

As used herein, "machine-readable medium" refers to a device able to temporarily or permanently store instructions and data that cause machine 1700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1716) for execution by a machine 1700 such that the instructions, when executed by one or more processors 1710 of the machine 1700, cause the machine 1700 to perform and one or more of the features described herein. Accordingly, a "machine-readable medium" may refer to a single storage device, as well as "cloud-based" storage systems or storage networks that include multiple storage apparatus or devices.

The I/O components 1750 may include a wide variety of hardware components adapted to receive input, provide output, produce output, transmit information, exchange information, capture measurements, and so on. The specific I/O components 1750 included in a particular machine will depend on the type and/or function of the machine. For example, mobile devices such as mobile phones may include a touch input device, whereas a headless server or IoT device may not include such a touch input device. The particular examples of I/O components illustrated in FIG. 17 are in no way limiting, and other types of components may be included in machine 1700. The grouping of I/O components 1750 are merely for simplifying this discussion, and the grouping is in no way limiting. In various examples, the I/O components 1750 may include user output components 1752 and user input components 1754. User output components 1752 may include, for example, display components for displaying information (for example, a liquid crystal display (LCD) or a projector), acoustic components (for example, speakers), haptic components (for example, a vibratory motor or force-feedback device), and/or other signal generators. User input components 1754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1750 may include biometric components 1756 and/or position components 1762, among a wide array of other environmental sensor components. The biometric components 1756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1762 may include, for example, location sensors (for example, a Global Position System (GPS) receiver), altitude sensors (for example, an air pressure sensor from which altitude may be derived), and/or orientation sensors (for example, magnetometers).

The I/O components 1750 may include communication components 1764, implementing a wide variety of technologies operable to couple the machine 1700 to network(s) 1770 and/or device(s) 1780 via respective communicative couplings 1772 and 1782. The communication components 1764 may include one or more network interface components or other suitable devices to interface with the network(s) 1770. The communication components 1764 may include, for example, components adapted to provide wired communication, wireless communication, cellular communication, Near Field Communication (NFC), Bluetooth communication, Wi-Fi, and/or communication via other modalities. The device(s) 1780 may include other machines or various peripheral devices (for example, coupled via USB).

In some examples, the communication components 1764 may detect identifiers or include components adapted to detect identifiers. For example, the communication components 1764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1762, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system comprising:
    at least one processor; and
    one or more computer readable media including instructions which, when executed by the at least one processor, cause the at least one processor to:
        receive a first image corresponding to a first real-world scene that includes a first object, the first object including a first object interior;
        automatically detect, within the first image, a first zone that corresponds to the first object interior;
        receive a first user input requesting an image capture of at least the first zone;
        capture, at a first time, at least the first zone of the first image in response to receiving the first user input;
        receive, at a second time subsequent to the first time, a second image corresponding to a second real-world scene that includes the first object, the first object including a second object interior;
        automatically detect, within the second image, a second zone that corresponds to the second object interior;
        determine that the first zone and the second zone differ by at least a first minimum amount based in part on a comparison between the first zone and the second zone; and automatically capture at least the second zone of the second image in response to the determination that the first zone and the second zone differ.

2. The system of claim 1, wherein the instructions further cause the at least one processor to:
   generate a first histogram for the first zone of the first image;
   generate a second histogram for the second zone of the second image; and
   wherein the determination that the first zone differs from the second zone is based at least on a comparison of the first histogram with the second histogram.

3. The system of claim 2, wherein the first histogram identifies a first number of pixels associated with a first luminance value, and the second histogram identifies a second number of pixels associated with the first luminance value, and instructions further cause the at least one processor to determine that the first number of pixels differs from the second number of pixels by at least the first amount.

4. The system of claim 1, wherein the instructions further cause the at least one processor to:
   determine that a first shape of the first outer boundary is substantially similar to a second shape of the second outer boundary; and
   wherein the automatic capture of at least the second zone of the second image is in response to the determination that the first zone and the second zone differ and the determination that the first shape is substantially similar to the second shape.

5. The system of claim 1, wherein the instructions further cause the at least one processor to:
   automatically detect, within the first image, a third zone that corresponds to a remainder of the first image outside of the first zone;
   automatically detect, within the second image, a fourth zone that corresponds to a remainder of the second image outside of the second zone;
   determine that the third zone and fourth zone are substantially similar based in part on a comparison between the third zone and the fourth zone; and
   wherein the automatic capture of at least the third zone of the second image is in response to the determination that the third zone and the fourth zone are substantially similar.

6. The system of claim 5, wherein the instructions further cause the at least one processor to:
   generate a first histogram for the third zone of the first image;
   generate a second histogram for the fourth zone of the second image; and
   wherein the determination that the third zone and the fourth zone are substantially similar is based at least on a comparison of the first histogram with the second histogram.

7. The system of claim 6, wherein the first histogram identifies a first number of pixels associated with a first luminance value, and the second histogram identifies a second number of pixels associated with the first luminance value, and the instructions further cause the at least one processor to determine that the first number of pixels differs from the second number of pixels by at most a predetermined percentage.

8. The system of claim 1, wherein the first object is one of a book, a projector screen, an electronic device display, and a television.

9. The system of claim 1, wherein the first image corresponds to a first clip of a first video file and the second image corresponds to a second clip of the first video file.

10. The system of claim 5, wherein the instructions further cause the at least one processor to:
    determine that the first zone and the third zone are associated with a first spatial arrangement relative to one another;
    determine that the second zone and the fourth zone are associated with a second spatial arrangement relative to one another; and
    wherein automatic capture of at least the second zone of the second image is based in part on determining that the first spatial arrangement and the second spatial arrangement are substantially similar.

11. A method for automatically capturing an image, the method comprising:
    receiving a first image corresponding to a first real-world scene that includes a first object, the first object including a first object interior;
    automatically detecting, within the first image, a first zone that corresponds to the first object interior;
    receiving a first user input requesting an image capture of at least the first zone;
    capturing, at a first time, at least the first zone of the first image in response to receiving the first user input;
    receiving, at a second time subsequent to the first time, a second image corresponding to a second real-world scene that includes the first object, the first object including a second object interior;
    automatically detecting, within the second image, a second zone that corresponds to the second object interior;
    determining that the first zone and the second zone differ by at least a first minimum amount based in part on a comparison between the first zone and the second zone; and
    automatically capturing at least the second zone of the second image in response to the determination that the first zone and the second zone differ.

12. The method of claim 11, further comprising:
    generating a first histogram for the first zone of the first image;
    generating a second histogram for the second zone of the second image; and
    wherein determining that the first zone differs from the second zone is based at least on a comparison of the first histogram with the second histogram.

13. The method of claim 12, wherein the first histogram identifies a first number of pixels associated with a first luminance value, and the second histogram identifies a second number of pixels associated with the first luminance value, and the method further comprises determining that the first number of pixels differs from the second number of pixels by at least the first amount.

14. The method of claim 11, further comprising:
    determining that a first shape of the first outer boundary is substantially similar to a second shape of the second outer boundary; and
    wherein the automatic capture of at least the second zone of the second image is in response to the determination that the first zone and the second zone differ and the determination that the first shape is substantially similar to the second shape.

15. The method of claim 11, further comprising:
    automatically detecting, within the first image, a third zone that corresponds to a remainder of the first image outside of the first zone;

automatically detecting, within the second image, a fourth zone that corresponds to a remainder of the second image outside of the second zone;

determining that the third zone and fourth zone are substantially similar based in part on a comparison between the third zone and the fourth zone; and wherein automatically capturing at least the third zone of the second image is in response to the determination that the third zone and the fourth zone are substantially similar.

16. The method of claim 15, further comprising:

generating a first histogram for the third zone of the first image;

generating a second histogram for the fourth zone of the second image; and wherein determining that the third zone and the fourth zone are substantially similar is based at least on a comparison of the first histogram with the second histogram.

17. The method of claim 16, wherein the first histogram identifies a first number of pixels associated with a first luminance value, and the second histogram identifies a second number of pixels associated with the first luminance value, and the method further comprises determining that the first number of pixels differs from the second number of pixels by at most a predetermined percentage.

18. The method of claim 11, wherein the first object is one of a book, a projector screen, an electronic device display, and a television.

19. The method of claim 11, wherein the first image corresponds to a first clip of a first video file and the second image corresponds to a second clip of the first video file.

20. A method for automatically capturing an image, the method comprising:

receiving a first image corresponding to a first real-world scene that includes a first object, the first object including a first object interior;

automatically detecting, within the first image, a first zone that corresponds to the first object interior;

capturing, at a first time, at least the first zone of the first image;

receiving, at a second time subsequent to the first time, a second image corresponding to a second real-world scene that includes the first object, the first object including a second object interior;

automatically detecting, within the second image, a second zone that corresponds to the second object interior;

determining that the first zone and the second zone differ by at least a first minimum amount based in part on a comparison between the first zone and the second zone; and automatically capturing at least the second zone of the second image in response to the determination that the first zone and the second zone differ.

\* \* \* \* \*